(12) United States Patent
Kobayashi et al.

(10) Patent No.: US 11,712,853 B2
(45) Date of Patent: Aug. 1, 2023

(54) THREE-DIMENSIONAL APPARATUS AND METHOD OUTPUTTING QUALITY INFORMATION OF FABRICATED THREE-DIMENSIONAL OBJECTS

(71) Applicants: Koji Kobayashi, Kanagawa (JP); Hanae Itabashi, Kanagawa (JP)

(72) Inventors: Koji Kobayashi, Kanagawa (JP); Hanae Itabashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 30 days.

(21) Appl. No.: 17/219,968

(22) Filed: Apr. 1, 2021

(65) Prior Publication Data

US 2021/0308950 A1   Oct. 7, 2021

(30) Foreign Application Priority Data

Apr. 3, 2020   (JP) .................................. 2020-067679
Mar. 16, 2021  (JP) .................................. 2021-042074

(51) Int. Cl.
  *G05B 19/4099*   (2006.01)
  *B29C 64/393*    (2017.01)

(52) U.S. Cl.
  CPC ........ *B29C 64/393* (2017.08); *G05B 19/4099* (2013.01)

(58) Field of Classification Search
  CPC .. B29C 64/393; B29C 64/386; G05B 19/4099
  See application file for complete search history.

(56) References Cited

U.S. PATENT DOCUMENTS

| 10,432,800 | B1 | 10/2019 | Bae | |
| 2014/0309765 | A1* | 10/2014 | Blanchfield, Jr. | B29C 64/386 703/1 |
| 2016/0314617 | A1* | 10/2016 | Forster | G06T 19/20 |
| 2017/0165748 | A1* | 6/2017 | Kamachi | B22F 12/13 |
| 2017/0359315 | A1* | 12/2017 | Zhang | B33Y 50/00 |
| 2018/0264742 | A1 | 9/2018 | Yang et al. | |
| 2018/0299866 | A1* | 10/2018 | Zhou | G05B 19/4103 |
| 2018/0299869 | A1 | 10/2018 | Yukumoto et al. | |
| 2018/0341248 | A1* | 11/2018 | Mehr | B22F 10/00 |
| 2019/0001574 | A1 | 1/2019 | Yackabonis et al. | |
| 2019/0389137 | A1* | 12/2019 | Frohnmaier | G05B 19/41875 |
| 2020/0016826 | A1* | 1/2020 | Edvinsson | B29C 64/393 |

(Continued)

FOREIGN PATENT DOCUMENTS

| EP | 3434392 A1 * | 1/2019 | ............ B22F 3/1055 |
| JP | 2020-082516 | 6/2020 | |

(Continued)

OTHER PUBLICATIONS

Extended European Search Report dated Oct. 26, 2021.

*Primary Examiner* — Alicia M. Choi
(74) *Attorney, Agent, or Firm* — Harness, Dickey & Pierce, P.L.C.

(57) ABSTRACT

A data output apparatus includes first circuitry configured to acquire predetermined information used for a three-dimensional fabrication; and second circuitry configured to output quality information for a three-dimensional object fabricated during the three-dimensional fabrication based on the predetermined information.

20 Claims, 31 Drawing Sheets

(56) References Cited

U.S. PATENT DOCUMENTS

| | | | |
|---|---|---|---|
| 2020/0242496 A1* | 7/2020 | Salasoo | G06N 20/00 |
| 2020/0247061 A1* | 8/2020 | Putman | B33Y 50/02 |
| 2020/0371509 A1* | 11/2020 | Mark | B29C 64/386 |
| 2021/0016509 A1* | 1/2021 | Vora | B29C 64/393 |
| 2021/0026332 A1* | 1/2021 | Inoue | G05B 19/4155 |
| 2021/0283851 A1* | 9/2021 | Hümmeler | B22F 12/90 |
| 2021/0356408 A1* | 11/2021 | Yacoubian | B22F 10/20 |
| 2022/0097307 A1* | 3/2022 | Erickson | B33Y 50/00 |

FOREIGN PATENT DOCUMENTS

| | | | | |
|---|---|---|---|---|
| WO | 2017/163432 A1 | 9/2017 | | |
| WO | WO2020031451 A1 * | 2/2021 | | B41J 29/393 |

* cited by examiner

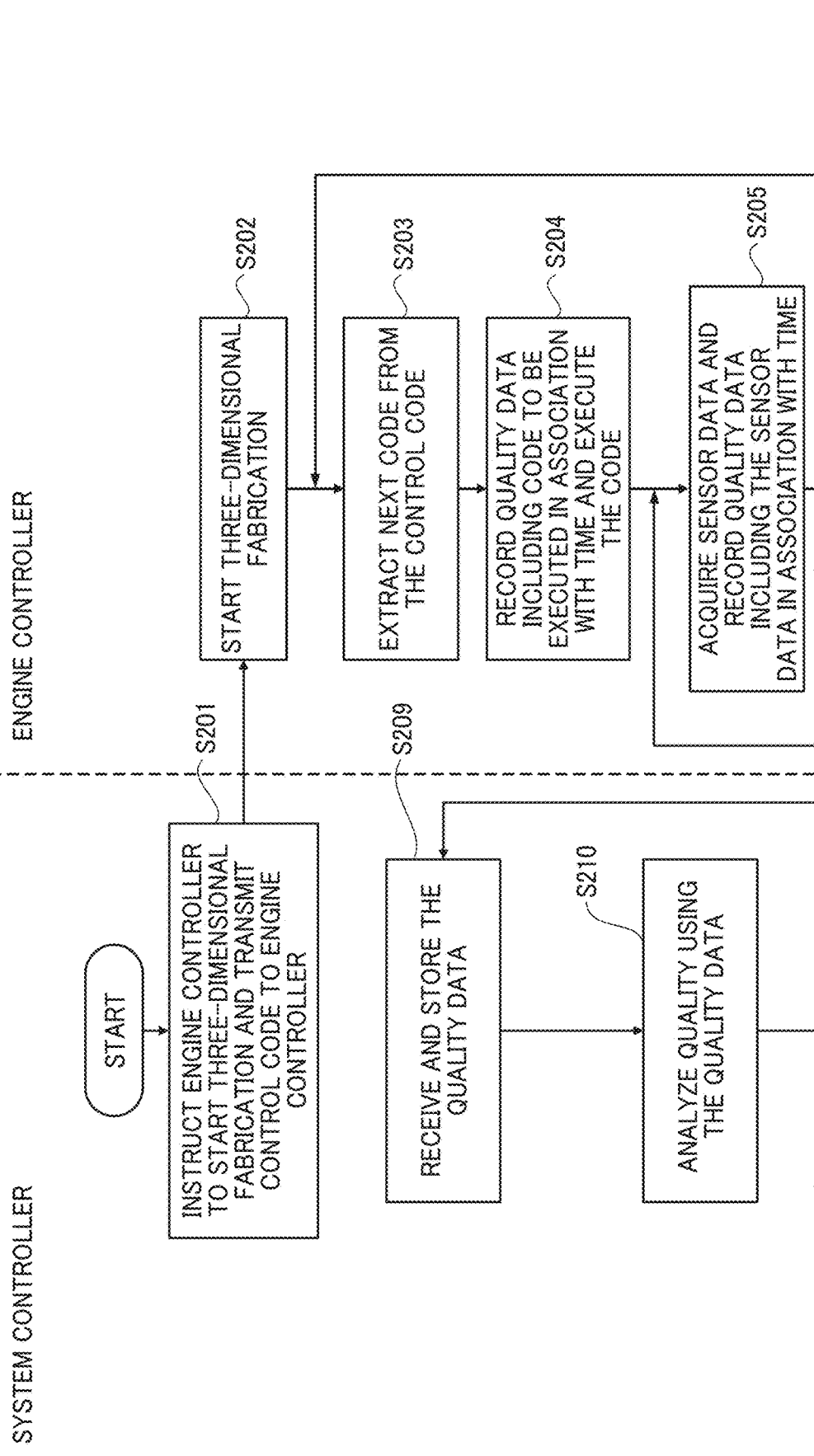

| No | TIME | TYPE | VALUE | UNITS |
|---|---|---|---|---|
| | | . | | |
| | | . | | |
| 100 | 01:02:12:012 | G CODE | G1 X234.158 Y211.101 E0.1126 F1800 | |
| 101 | 01:02:12:015 | NOZZLE TEMPERATURE | 190.2 | DEGREE |
| 102 | 01:02:12:020 | EXTRUDER MOTOR CURRENT | 0.25 | A |
| 103 | 01:02:12:030 | EXTRUDER MOTOR SPEED | 2.2 | mm/sec |
| 104 | 01:02:12:040 | X-MOTOR CURRENT | 2.1 | A |
| 105 | 01:02:12:050 | X-MOTOR SPEED | 3.1 | mm/sec |
| 106 | 01:02:12:060 | Y-MOTOR CURRENT | 0.705 | A |
| 107 | 01:02:12:070 | Y-MOTOR SPEED | 4.2 | mm/sec |
| 108 | 01:02:12:080 | Z-MOTOR CURRENT | 0 | A |
| 109 | 01:02:12:090 | Z-MOTOR SPEED | 0 | mm/sec |
| 110 | 01:02:12:100 | EXTRUDER MOTOR CURRENT | 0.25 | A |
| 111 | 01:02:12:115 | NOZZLE TEMPERATURE | 189.5 | DEGREE |
| 112 | 01:02:12:110 | EXTRUDER MOTOR SPEED | 5.2 | mm/sec |

FIG. 10B

| | | | | |
|---|---|---|---|---|
| 312 | 01:02:14:299 | G CODE | G1 X232.816 Y211.438 E0.1139 F1800 | |
| 313 | 01:02:14:300 | X-MOTOR CURRENT | 0.73 | A |
| 314 | 01:02:14:305 | NOZZLE TEMPERATURE | 191.1 | DEGREE |
| 315 | 01:02:14:310 | X-MOTOR SPEED | 3.1 | mm/sec |

FIG. 11

| No | TIME | TYPE | VALUE | UNITS |
|---|---|---|---|---|
| 1 | 00:00:00:000 | Log | Build Start | |
| | | ⁝ | | |
| | | ⁝ | | |
| 312 | 01:02:14:299 | G CODE | G1 X232.816 Y211.438 E0.1139 F1800 | |
| 313 | 01:02:14:300 | X-MOTOR CURRENT | 0.73 | A |
| 314 | 01:02:14:305 | NOZZLE TEMPERATURE | 191.1 | DEGREE |
| 315 | 01:02:14:306 | Log | Internal Error 205 | |
| 316 | 01:02:14:310 | X-MOTOR SPEED | 0 | mm/sec |
| 317 | 01:02:14:311 | Log | Error occurred. X motor Speed | |
| 318 | 01:02:14:400 | Log | Build Failed | |
| | | ⁝ | | |
| | | ⁝ | | |

FIG. 12

| No | TIME | TYPE | VALUE | UNITS |
|---|---|---|---|---|
| 0 | 00:00:00:000 | NOZZLE TEMPERATURE SETTING | 190 | DEGREE |
| 0 | 00:00:00:000 | FABRICATION MODE SETTING | HIGH QUALITY | |
| 1 | 00:00:00:000 | Log | Build Start | |
| ... | | . | | |
| ... | | . | | |
| ... | | . | | |
| 312 | 01:02:14.299 | G CODE | G1 X232.816 Y211.438 E0.1139 F1800 | |
| 313 | 01:02:14.300 | X-MOTOR CURRENT | 0.73 | A |
| 314 | 01:02:14.305 | NOZZLE TEMPERATURE | 191.1 | DEGREE |
| 315 | 01:02:14.306 | Log | Internal Error 205 | |
| 316 | 01:02:14.310 | X-MOTOR SPEED | 0 | mm/sec |
| 317 | 01:02:14.311 | Log | Error occurred. X motor Speed | |
| 318 | 01:02:14.400 | Log | Build Failed | |

FIG. 15

| No | TIME | TYPE | VALUE | UNITS |
|---|---|---|---|---|
| 0 | 00:00:00:000 | NOZZLE TEMPERATURE SETTING | | 190 DEGREE |
| 0 | 00:00:00:000 | FABRICATION MODE SETTING | HIGH QUALITY | |
| 1 | 00:00:00:000 | Log | Build Start | |
| . | . | . | . | . |
| . | . | . | . | . |
| . | . | . | . | . |
| 311 | 01:02:14.200 | Image | | 23 Number |
| 312 | 01:02:14.299 | G CODE | G1 X232.816 Y211.438 E0.1139 F1800 | |
| 313 | 01:02:14.300 | X-MOTOR CURRENT | | 0.73 A |
| 314 | 01:02:14.305 | NOZZLE TEMPERATURE | | 191.1 DEGREE |
| 315 | 01:02:14.306 | Log | Internal Error 205 | |
| 316 | 01:02:14.310 | X-MOTOR SPEED | | 0 mm/sec |
| 317 | 01:02:14.311 | Log | Error occurred. X motor Speed | |
| 318 | 01:02:14.400 | Log | Build Failed | |
| . | . | . | . | . |
| . | . | . | . | . |

FIG. 23

| SETTING INFORMATION/ STATE INFORMATION | MAXIMUM VALUE | MINIMUM VALUE | PERMISSIBLE VALUE | NOTES |
|---|---|---|---|---|
| TEMPERATURE | 100 DEGREES | 50 DEGREES | | ... |
| SET TEMPERATURE | HIGH | LOW | INTERMEDIATE/ LOWER-MIDDLE | OPTIONS MAY BE SET, INSTEAD OF FOLLOWING SET NUMERICAL VALUES |
| TIME | 3h | 1h | | ... |
| HUMIDITY | 90% | 70% | | ... |
| | ON | ON | ... | WHEN ONE OF TWO VALUES IS ACCEPTED, THE SAME VALUE IS SET |
| ... | ... | ... | ... | ... |

FIG. 26A

| SETTING INFORMATION/ STATE INFORMATION | 20xx/05/22 13:00 | 20xx/05/25 10:00 | 20xx/08/03 20:37 | ... |
|---|---|---|---|---|
| TEMPERATURE | 100 DEGREES | 50 DEGREES | 50 DEGREES | ... |
| SET TEMPERATURE | HIGH | LOW | LOW | ... |
| TIME | 3h | 1h | 5h | ... |
| HUMIDITY | 90% | 70% | 90% | ... |
|  | ON | ON | ON | ... |
| ... | ... | ... | ... | ... |

FIG. 26B

| TEMPERATURE | | | |
|---|---|---|---|
| NUMBER | UPDATE DATE | VALUE | ... |
| 1 | 2020/05/22 13:00 | 95 DEGREES | |
| 2 | 2020/05/25 10:00 | 97 DEGREES | |
| 3 | 2020/08/03 20:37 | 80 DEGREES | |
| 4 | 2020/11/11 09:56 | 100 DEGREES | |
| ... | ... | ... | ... |

THREE-DIMENSIONAL APPARATUS AND METHOD OUTPUTTING QUALITY INFORMATION OF FABRICATED THREE-DIMENSIONAL OBJECTS

CROSS-REFERENCE TO RELATED APPLICATIONS

This patent application is based on and claims priority pursuant to 35 U.S.C. § 119(a) to Japanese Patent Application No. 2020-067679, filed on Apr. 3, 2020 and Japanese Patent Application No. 2021-042074, filed on Mar. 16, 2021, in the Japan Patent Office, the entire disclosure of which is hereby incorporated by reference herein.

BACKGROUND

Technical Field

Embodiments of the present disclosure relate to a data output apparatus, a three-dimensional fabrication system, and a data output method.

Related Art

Three-dimensional fabrication apparatuses are currently known that fabricate three-dimensional objects without using molds.

SUMMARY

In an aspect of this disclosure, there is provided a data output apparatus including first circuitry configured to acquire predetermined information used fora three-dimensional fabrication; and second circuitry configured to output quality information for a three-dimensional object fabricated during the three-dimensional fabrication based on the predetermined information.

In another aspect of this disclosure, there is provided a three-dimensional fabrication system including: a three-dimensional fabrication apparatus configured to perform a three-dimensional fabrication in accordance with input data. The three-dimensional fabrication apparatus includes first circuitry configured to acquire predetermined information used for the three-dimensional fabrication; and second circuitry configured to output quality information for a three-dimensional object fabricated during the three-dimensional fabrication based on the predetermined information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 8A and 8B indicate a flowchart of a process of performing fabrication while acquiring quality data, performed by the three-dimensional fabrication apparatus according to the embodiment;

FIG. 9 is an illustration of data structure including control codes, which is processed by the three-dimensional fabrication apparatus according to the embodiment;

FIGS. 10A and 10B indicate a table of a data structure of quality data recorded by the three-dimensional fabrication apparatus according to the embodiment;

FIG. 11 indicates a table of a data structure of quality data recorded by a three-dimensional fabrication apparatus according to another embodiment of the present disclosure;

FIG. 12 indicates a table of a data structure of quality data recorded by a three-dimensional fabrication apparatus according to still another embodiment of the present disclosure;

FIG. 15 indicates a table of a data structure of quality data recorded by the three-dimensional fabrication apparatus according to still another embodiment of the present disclosure;

FIG. 23 is an illustration of a table for describing a process of comparing the extracted setting information with a numerical range in the three-dimensional fabrication system according to yet another embodiment;

FIGS. 26A and 26B are illustrations for describing a process of storing and discarding the setting information extracted in the three-dimensional fabrication system according to yet another embodiment.

Figure 1A:
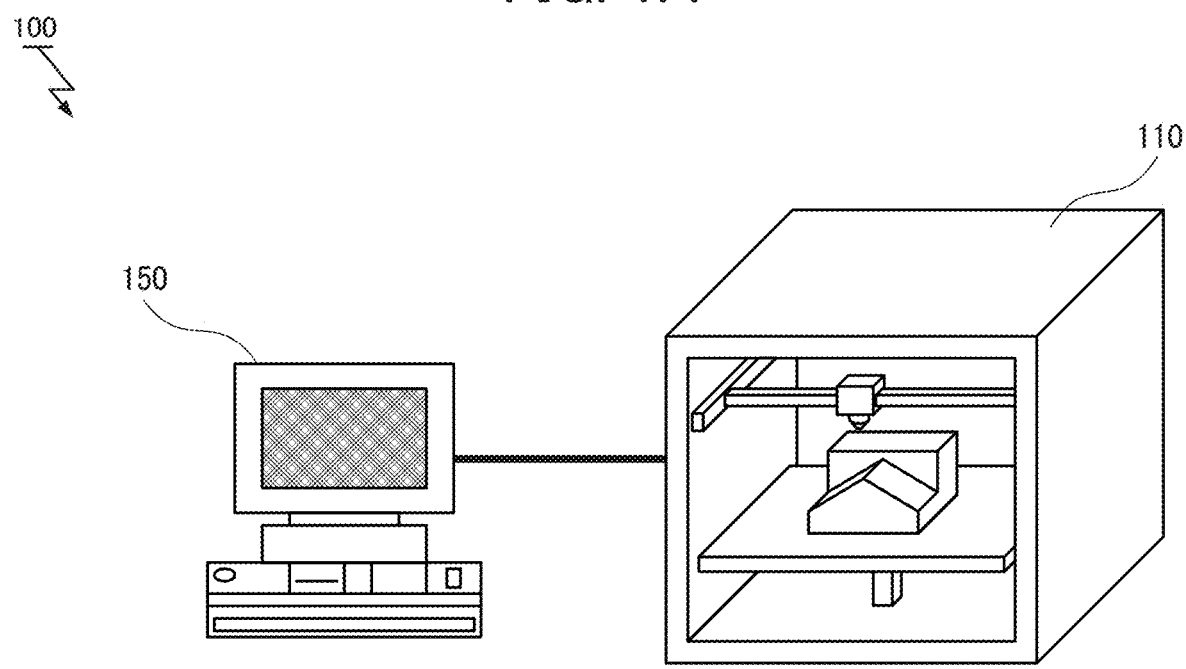
FIGS. 1A and 1B are illustrations of an entire configuration of a three-dimensional fabrication system according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The embodiments of the present disclosure enable outputting of quality information about a three-dimensional object.

Some embodiments of the present disclosure are described below, but no limitation is indicated thereby and various applications and modifications may be made without departing from the scope of the disclosure. In the drawings referred to below, the same reference numerals are used for the common elements, and the description of which are omitted as appropriate.

Figure 1B:
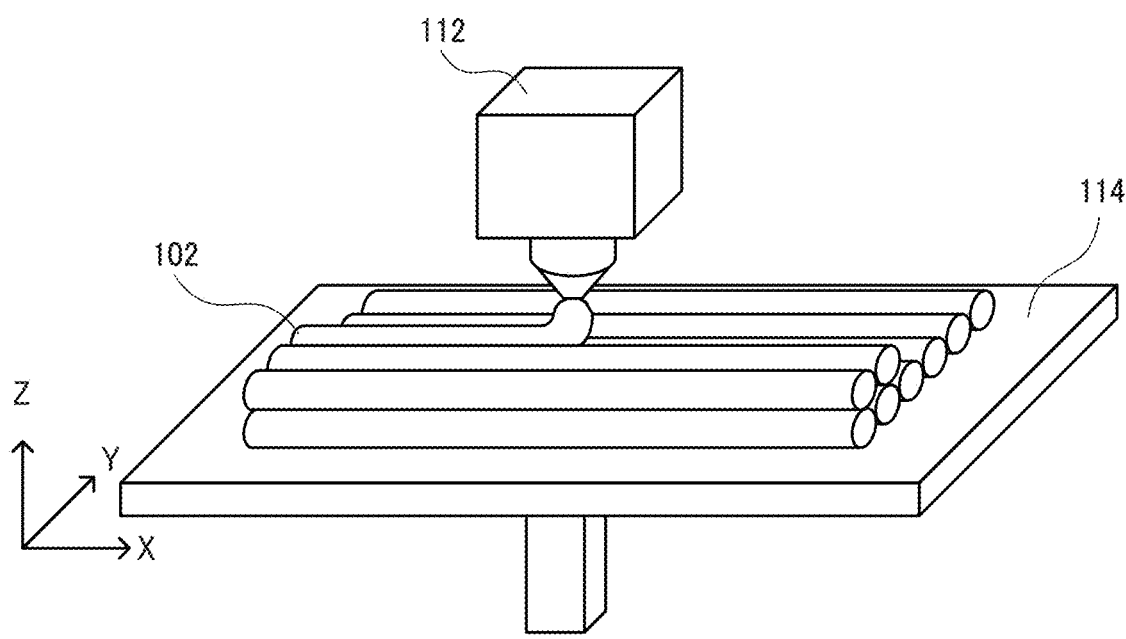

FIGS. 1A and 1B are illustrations of an entire configuration of a three-dimensional fabrication system 100 according to a first embodiment of the present disclosure. In the following examples, a fabrication device employs a fused filament fabrication (FFF). This is only one example. In some other examples, another fabrication method such as stereolithography, selective laser sintering, or binder jetting may be employed. In the following description, a height direction of a three-dimensional object is referred to as a Z-axis direction, and a plane orthogonal to the Z-axis direction is referred to as an XY plane for convenience of description.

As illustrated in FIG. 1A, the three-dimensional fabrication system 100 includes a three-dimensional fabrication apparatus 110 (three-dimensional fabrication means) that fabricates a three-dimensional object. The three-dimensional fabrication apparatus 110 receives data used to fabricate a desired three-dimensional object from, for example, an information processing apparatus 150. The three-dimensional modeling device 110 includes a device that discharges material (hereinafter, referred to as fabrication material) for forming a three-dimensional object, to a designated position. The information processing apparatus 150 operates as a controller that controls a process executed by the three-dimensional fabrication apparatus 110. The information processing apparatus 150 has capabilities of reading a 3D model representing a desired three-dimensional object and changing a direction or arrangement coordinates of the 3D model, and generates a discharge position of the fabrication material according to software. The capabilities of the information processing apparatus 150 may be incorporated in the three-dimensional fabrication apparatus 110.

In the FFF, a reel of resin filament as the fabrication material is transferred by an extruder to a nozzle, and is then heated by a heater and melted to be liquid. The fabrication material is discharged in a filament form from a high-temperature nozzle of a head 112. As illustrated in FIG. 1B, the head 112 discharges the fabrication material onto a fabrication plate 114 through the nozzle while moving in a direction parallel to the XY plane, thus producing fabrication layers 102 in the XY plane. More specifically, the head 112 draws lines of the fabrication material within the same plane on the fabrication plate 114, and the fabrication material discharged onto the fabrication plate 114 is cooled to be cured. Thus, a single fabrication layer (i.e., a single layer of fabrication layers to be formed) of a three-dimensional object to be fabricated is produced. When the first layer of the fabrication layers to be formed is completely produced, the fabrication plate 114 lowers by the height (i.e., deposition pitch) of one layer in the Z-axis direction. The head 112 subsequently produces a second fabrication layer in the same manner as the first layer. The three-dimensional fabrication apparatus 110 repeats the above-described operations to deposit a fabrication layer, thus producing a resultant three-dimensional object. In the above-described configuration, the head 112 moves in the XY plane, and the fabrication plate 114 moves in the Z-axis direction. This configuration is only one example, and another configuration is applicable in the present disclosure.

Figure 2:
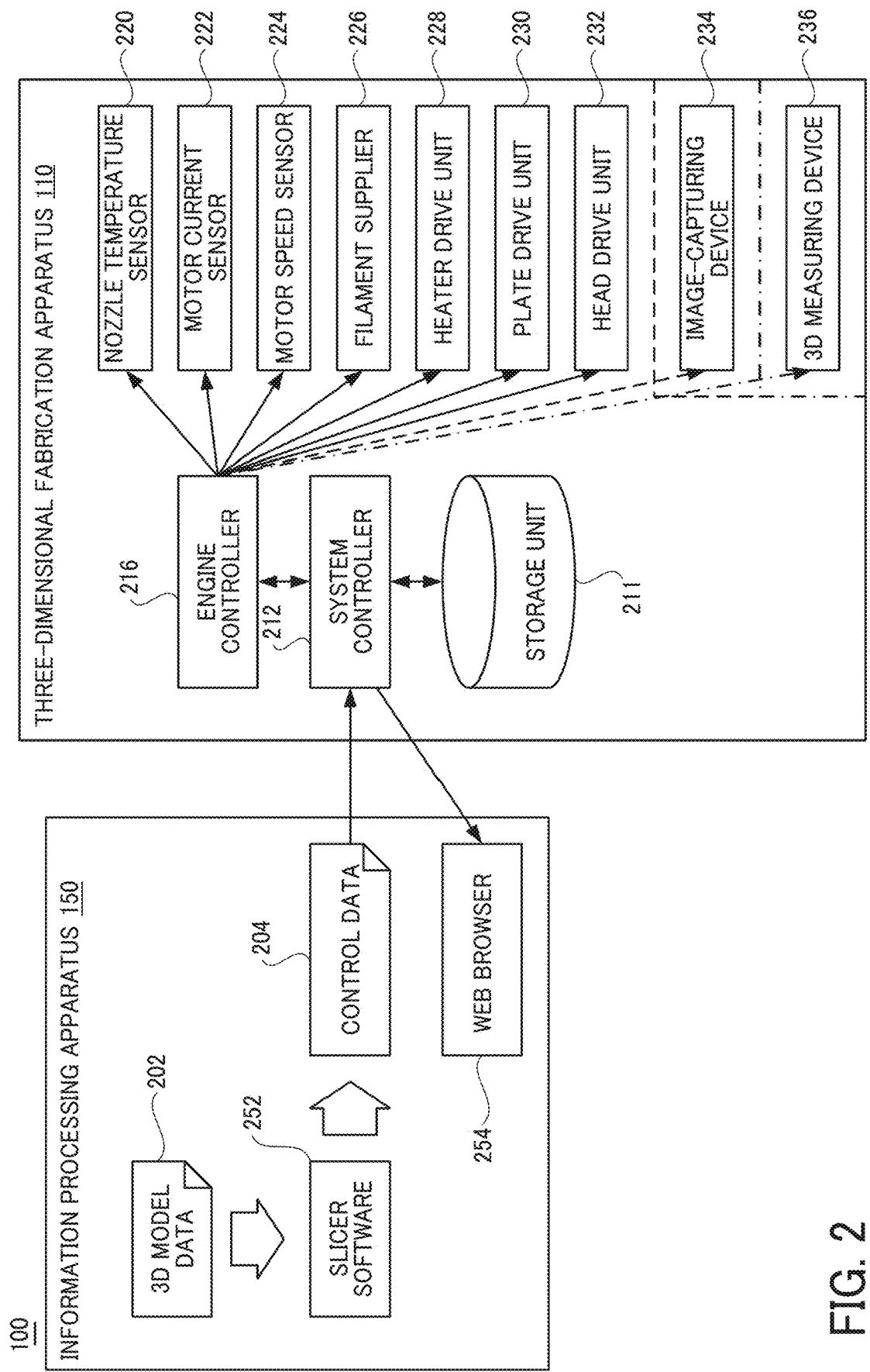
FIG. 2 is a block diagram of a system configuration of the three-dimensional fabrication system in FIGS. 1A and 1B.

FIG. 2 is a block diagram of a system configuration of the three-dimensional fabrication system 100 according to the first embodiment. The information processing apparatus 150 is, for example, a personal computer (PC), and slicer software 252 operates in the information processing apparatus 150.

Further, 3D model data 202 is input to the slicer software 252. The 3D model data 202 is not particularly limited, but is data representing a 3D shape in a predetermined expression format such as standard triangulated language (STL). The slicer software 252 reads the 3D model data 202 and renders a 3D model subjected to a slice process in the Z-axis direction (i.e., the height direction, the same direction as the Z-axis direction during fabrication), generating slice data. For each slice data, the slicer software 252 outputs control data 204 representing a tool path that is a path in which the nozzle discharges fabrication material.

Figure 3:
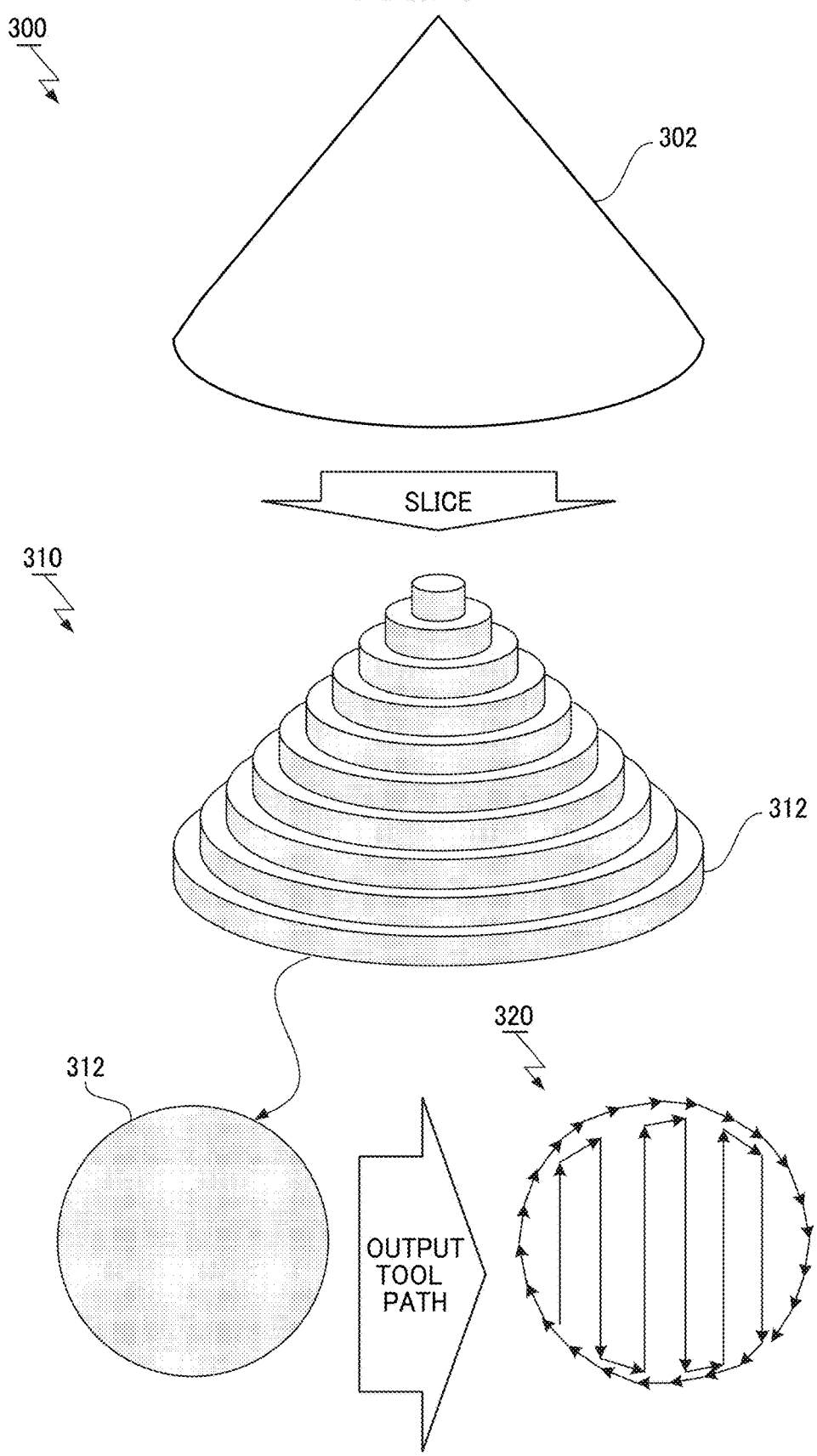
FIG. 3 is an illustration for describing the relation of 3D model data, slice data, and tool path of a three-dimensional fabrication apparatus according to an embodiment of the present disclosure.

FIG. 3 is an illustration for describing the relation of 3D model data, slice data, and a tool path of the three-dimensional fabrication apparatus 110 according to the first embodiment of the present disclosure.

The slicer software 252 minutely cuts 3D model 302 represented by 3D model data 300 into slices in the height direction (i.e., the Z-axis direction), and generates slice data 312 including the cross-sectional shapes of the 3D model 302 taken at the respective Z-coordinates. In the deposition manufacturing, the slicer software 252 calculates positions where fabrication material is to be discharged, and a path for discharging the fabrication material constitutes a tool path 320.

The control data 204 is aggregate data including tool-path data and control codes for controlling the three-dimensional fabrication apparatus 110 for, for example, temperature control during fabrication. Examples of the control data 204 include, but not limited to, a G-code.

Referring back to FIG. 2, the information processing apparatus 150 and the three-dimensional fabrication apparatus 110 are communicably connected to each other via a given communication channel. The communication channel enables communication by connecting nodes with a wired local area network (LAN), a wireless LAN, or a universal serial bus (USB) cable LAN. In the following embodiments, the information processing apparatus 150 and the three-dimensional fabrication apparatus 110 transfer data therebetween via the communication channel. However, no limitation is intended therein. In some examples, such data transfer between the information processing apparatus 150 and the three-dimensional fabrication apparatus 110 is achieved with a non-volatile storage medium such as a USB memory or SD card (registered trademark), instead of the use of the communication channel.

The three-dimensional fabrication apparatus 110 fabricates a three-dimensional object in accordance with the control codes included in the control data 204, received from the information processing apparatus 150. The three-dimensional fabrication apparatus 110 includes a storage unit 211 (a memory), a system controller 212, and an engine controller 216.

The system controller 212 receives the control data 204 via the communication channel, extracts a control code from the control data 204, and transmits the control code to the engine controller 216. Further, the system controller 212 receives any data including sensor data from the engine controller 216 to analyze the cause of quality defects. The system controller 212 is usually configured by a central processing unit (CPU) and a storage device such as a memory.

The storage unit 211 is a storage area to store the sensor data received and is configured by a storage such as a hard disk drive (HDD) or a solid state disk (SSD).

The engine controller 216 extracts, for analysis, instructions from the control code one by one, received from the system controller 212 so as to control the three-dimensional fabrication apparatus 110. The engine controller 216 according to some embodiments simultaneously acquires a time of issuance of an instruction of the control code and the sensor data at the time, and stores the sensor data in association with the time. The engine controller 216 is commonly configured by a CPU and an input/output (I/O) device for outputting a control signal.

The three-dimensional fabrication apparatus 110 further includes a nozzle temperature sensor 220, a motor current sensor 222, a motor speed sensor 224, a filament supplier 226, a heater drive unit 228, a plate drive unit 230, and a head drive unit 232. These elements are connected to the engine controller 216 and respectively operate in response to control signals output from the engine controller 216, outputting sensor measurement values to the engine controller 216 or performing both operations.

The heater drive unit 228 is configured by a heater that heats a nozzle for discharging fabrication material and a fabrication plate; and hardware and software that drive the heater. Notably, the three-dimensional fabrication apparatus 110 employs various heaters at different positions.

The nozzle temperature sensor 220 detects the temperature of the region heated by the heater. The nozzle temperature sensor 220 is commonly configured by, for example, a thermocouple. In addition to the nozzle temperature sensor 220, another temperature sensor is used in a pair with the heater.

The head drive unit 232 is a driver that drives the head 112 provided with a nozzle and an extruder to move in the XY direction. The plate drive unit 230 is a driver that drives the fabrication plate 114 to move in the Z direction. Each of the head drive unit 232 and the plate drive unit 230 includes, for example, a drive motor, a mechanical device for transmitting driving force (e.g., a belt or a ball screw), and a sensor that detects position information. Examples of the drive motor include, but not particularly limited to, a servo motor and a stepping motor. The head drive unit 232 and the plate drive unit 230 cooperate to three-dimensionally move the nozzle tip that indicates a fabrication position, serving as the drivers that operate in XYZ directions so as to enable fabrication.

The filament supplier 226 is a driver that transfers, to the nozzle, the filament (i.e., fabrication material) whose quantity is sufficient for fabrication. The filament supplier 226, also called an extruder, includes a gear for holding the filament and a motor for driving the gear.

The motor current sensor 222 measures drive current of each motor M so as to measure the load on each motor. The motor speed sensor 224 detects the speed of each motor M. The motor speed sensor 224 detects the speed by measuring the number of rotations of the motor in a certain time using, for example, an encoder or a timer.

In some embodiments, the information processing apparatus 150 converts the 3D model data 202 into the control data 204 including control codes used in the three-dimensional fabrication apparatus 110, with the slicer software 252. The information processing apparatus 150 transmits the control data 204 to the three-dimensional fabrication apparatus 110 via the communication channel. In accordance with the control data 204, the three-dimensional fabrication apparatus 110 controls a heater and a motor.

However, no limitation is intended therein. In some other example, the three-dimensional fabrication apparatus 110 generates the control data 204. Alternatively, instead of the three-dimensional fabrication apparatus 110 and the information processing apparatus 150, an external server generates the control data 204. In the case where the external server generates the control data 204, the generation of the control data is executed on an on-premise server or a server to which the apparatuses can be connected via Internet while referring to cloud.

In the embodiment illustrated in FIG. 2, a web browser 254 on the information processing apparatus 150 is used to access the system controller 212 of the three-dimensional fabrication apparatus 110, for various settings and referring to quality data to be described later.

Figure 4:
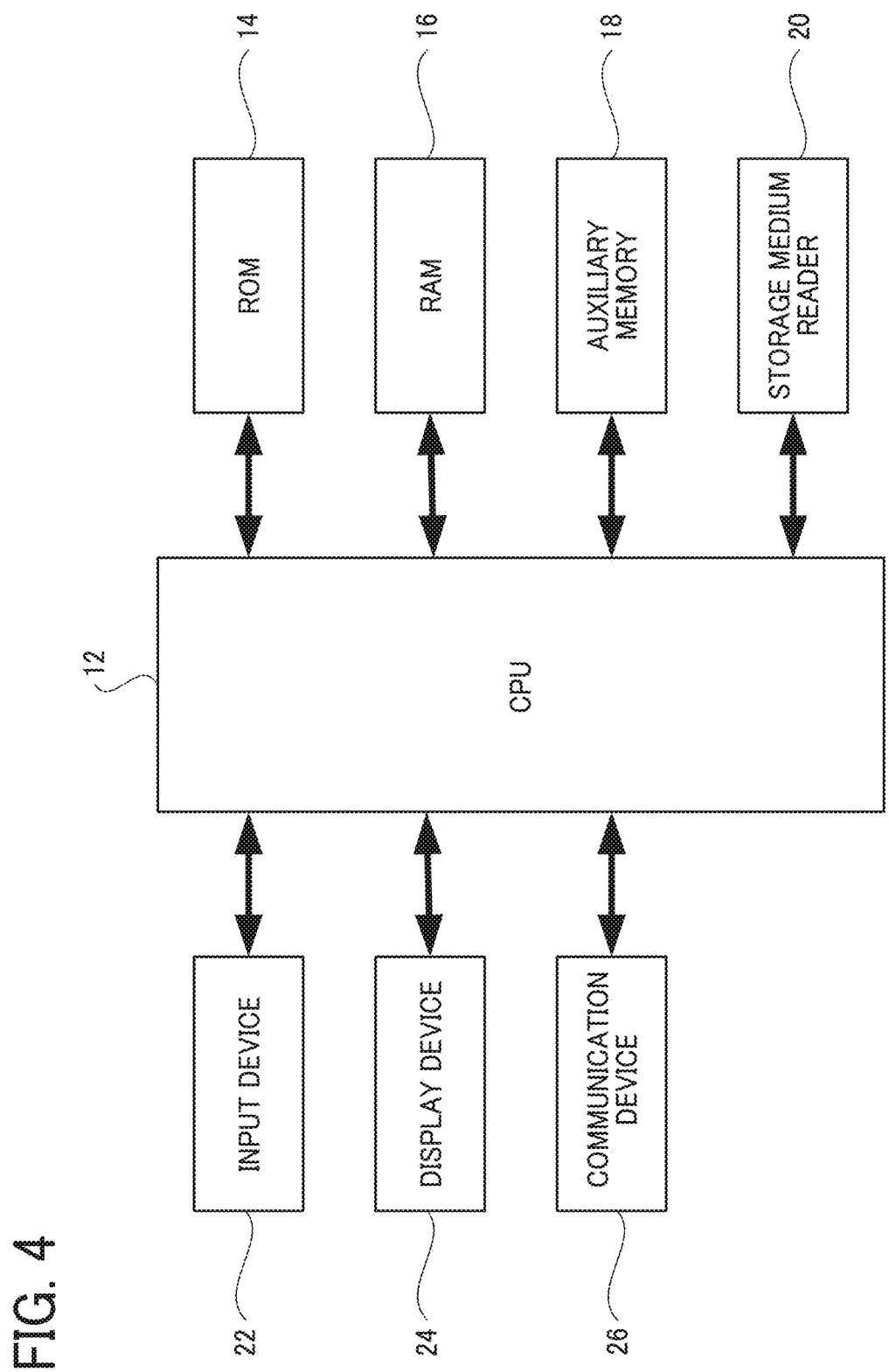
FIG. 4 is a hardware block diagram of a controller of the three-dimensional fabrication apparatus according to the embodiment.

FIG. 4 is a hardware block diagram of the three-dimensional fabrication apparatus 110 according to the first embodiment. The system controller 212 and the engine controller 216 have the hardware configuration in FIG. 4.

The system controller 212 and the engine controller 216 each have a CPU 12, a read only memory (ROM) 14, a random access memory (RAM) 16, an auxiliary memory 18, a storage medium reader 20, an input device 22, a display device 24, and a communication device 26.

The CPU 12 is a circuit or circuitry configured by a microprocessor and peripheral circuits and controls the entire operations of the three-dimensional fabrication apparatus 110. The ROM 14 is a memory that stores a predetermined control program executed by the CPU 12. The RAM 16 is used as a work area in which the CPU 12 executes the prescribed control programs stored in the ROM 14 to perform various controls.

The auxiliary memory 18 is a nonvolatile storage device such as an HDD, an SSD, or a SD (registered trademark) card and stores various information including general-purpose operating systems (OS) and different programs. The storage unit 211 in FIG. 2 may be replaced by the auxiliary memory 18. The storage medium reader 20 is a device to which information is input from an external storage medium such as a compact disk (CD), a digital versatile disk (DVD), and a universal serial bus (USB).

The input device 22 is used for a user's various input operations and includes a mouse, a keyboard, a touch panel switch superimposed on the display screen of the display device 24. The display device 24 displays various data on the display screen. The display device 24 includes a liquid crystal display (LCD), an organic electro luminescence (EL) display, and cathode-ray tube (CRT). The communication device 26 communicates with another device via network and supports communications over various network configurations such as a wired network and a wireless network.

The hardware configuration of the system controller 212 and the engine controller 216 is described above with reference to FIG. 4. The information processing apparatus 150 can be provided with the same hardware configuration and implements different processes according to software installed therein.

Figure 5:
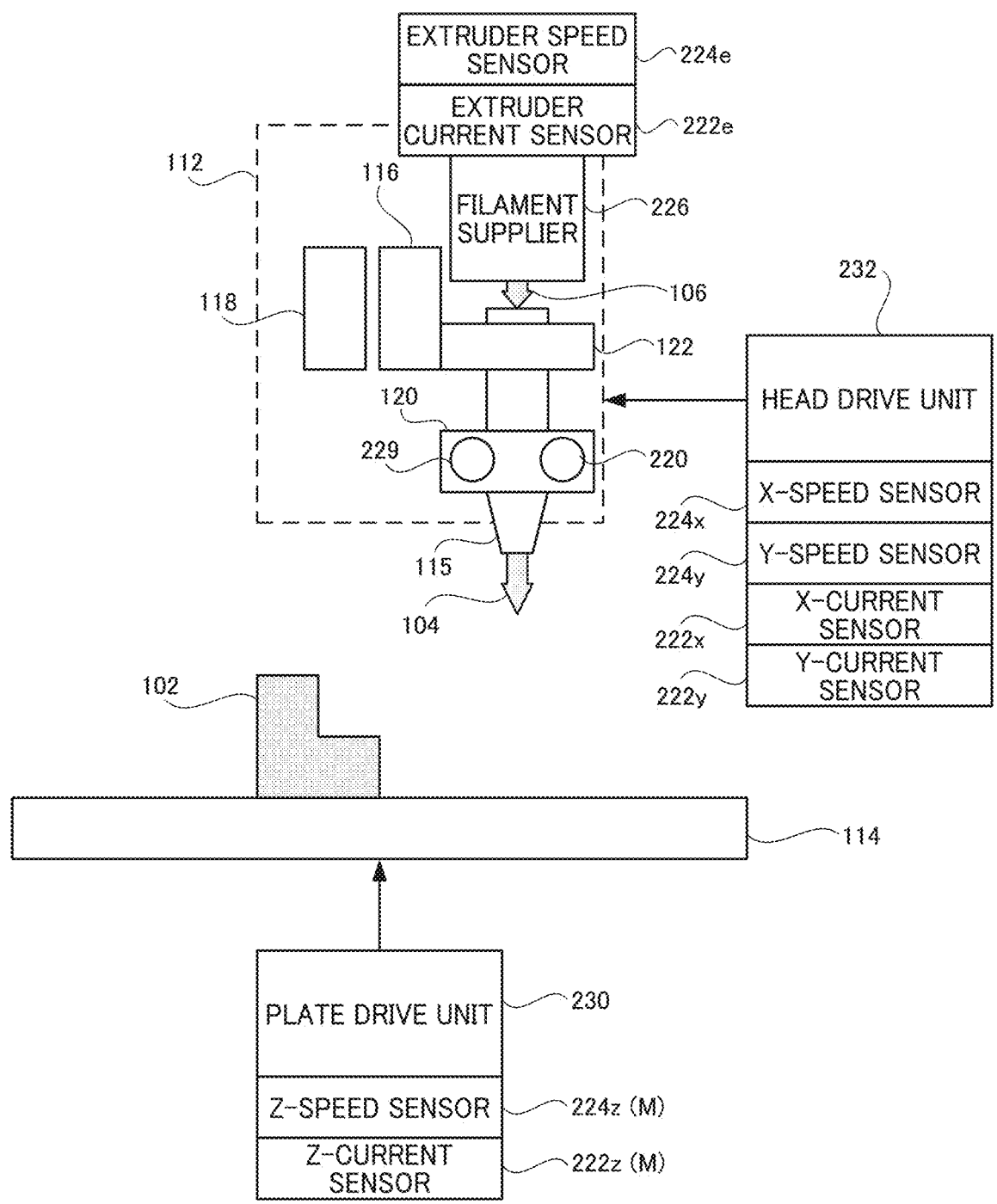
FIG. 5 is an illustration of components around a nozzle of the three-dimensional fabrication apparatus according to the embodiment.

Next, a device that controls the head 112 and the fabrication plate 114 of the three-dimensional fabrication apparatus 110 is described with reference to FIG. 5. FIG. 5 is an illustration of components around a nozzle of the three-dimensional fabrication apparatus 110 according to the first embodiment. Notably, the sensors 222 and 224 in FIG. 2 are indicated for the typical motors in FIG. 5.

The head 112 includes a nozzle 115, a filament supplier 226, a heat sink 116, and a fan 118. The head 112 is driven in the XY plane by the head drive unit 232.

The nozzle 115 is manufactured by processing metal such as stainless steel or brass and is in the form of a hollow tube. However, no limitation is intended therein. The nozzle 115 tapers toward its end (i.e., tip end) having an opening for discharging with a diameter of approximately 0.3 mm to 0.5 mm at the end. However, this is only one example. In some examples, the end portion of the nozzle 115, which is downstream in the feed direction of a filament 106, is separate from the other portion that is a pipe portion. In the present embodiment, the nozzle 115 refers to both the end portion and the pipe portion.

Near the end of the nozzle 115, a heating block 120 is in close contact with the nozzle 115. The heating block 120 includes a heater 229 (heating means). The heat generated by the heater 229 is transferred to the nozzle 115. The heating block 120 further includes the nozzle temperature sensor 220. The engine controller 216 or another temperature controller controls the heater 229 to heat the nozzle 115 up to a predetermined temperature that is determined according to the type of material of the filament or the shape of the nozzle 115, while reading a signal representing the temperature received from the nozzle temperature sensor 220.

At the other end of the nozzle 115 (i.e., a rear end upstream in the feed direction of the filament 106) opposed to the heating block 120, a cooling block 122 is in close contact with the nozzle 115. For example, the cooling block 122 is connected to the heat sink 116 having an air-cooling structure for cooling with air blown by an electric fan 118.

The filament 106 is fed into the nozzle 115 from the rear side using extruder, and is melted at the tip end by the heat of the nozzle 115 to become liquid. Thus, the liquid fabrication material 104 is discharged from the nozzle 115. Although the motor for the extruder may adopt different types of systems, a servo motor or a stepping motor is suitable for accurately controlling the feeding amount of the filament.

For the servo motor, the encoder coupled to the motor axis detects the amount of motion and rotation speed of the motor, which is subject to feedback control to control the number of rotation of the motor, or the speed of feed of the filament. Further, the current applied to the motor is measured to maintain a constant load on the motor. For the stepping motor, the same configuration using an encoder is applicable.

The tip end of the nozzle 115 is heated, and the rear end is cooled. Such a nozzle 115 has a maximum temperature near the heating block 120 and a minimum temperature near the cooling block 122, creating temperature gradient. The filament 106 to be fed into the nozzle 115 is resin, whose melting point is determined according to the kind of material, and such filament is liquid at temperatures above the melting point and solid at temperatures below the melting point. In fact, however, the filament 106 may be semisolid in a certain temperature range. To render the filament 106 liquid or fluid, an area near the heating block to the tip end of the nozzle 115 is set any temperature above the melting point. The temperature within the nozzle 115 decreases as the position becomes closer to the rear end of the nozzle 115. This determines the position of the liquid level that is the boundary at which the filament remains unmelted. At the liquid level, the material is semisolid close to solid, the semisolid resin serves to cover liquid resin.

During the process of discharging the filament 106, feeding the filament 106 toward the tip end of the nozzle 115 pushes the semisolid cover, applying force to compress the material that has been liquefied. Thus, liquid resin 104 is discharged from the nozzle 115 through the opening at the tip end. With such liquid resin 104, a three-dimensional object 102 is fabricated on the fabrication plate 114.

The three-dimensional fabrication apparatus has various advantages but has difficulties in internal inspection of the fabricated three-dimensional object and assurance of internal quality of the object (e.g., how the internal quality is maintained), which cannot be observed from its external appearance.

Even when some three-dimensional fabrication apparatuses fail in fabrication of an object, such a failure cannot be easily identified, and a cause for failing to achieve intended quality is undetermined before the internal inspection. Fabricating a three-dimensional object usually takes a certain time period. If quality failure of a fabricated object is identified after the long duration of the fabrication of the object, the material and time spend on fabricating the object end up wasted, thus adversely affecting the cost and productivity. If the cause analysis of errors and quality defects is not sufficient, quality defects can occur frequently.

For determining the quality by the conventional three-dimensional fabrication apparatuses, however, the technology is known that acquires an image of a slice surface or the entire fabricated object, which has been captured by a camera or another device during fabrication, and detects any defect or acquires a particular sensor value and determines a defect. However, such a technology alone has a difficulty in analyzing and determining a cause of quality defects and fails to assess the quality of a resultant three-dimensional object.

To avoid such a situation, the three-dimensional fabrication apparatus 110 according to the embodiments of the present disclosure acquires multiple pieces of sensor data as predetermined information during fabrication, used to analyze and identify a cause of quality defects of a fabricated object. The three-dimensional fabrication apparatus 110 outputs quality information based on the predetermined information for a fabricated three-dimensional object. Each piece of sensor data is preferably recorded with its acquiring timing in association with local data (e.g., each control code and an instruction or an instruction group included in each control code) of input data for fabrication. This enables the three-dimensional fabrication apparatus 110 to assess quality of a fabricated object and output the assessment result, and further analyze in detail a cause of quality defect when the quality defect is detected. The three-dimensional fabrication apparatus 110 is a data output apparatus according to the embodiments of the present disclosure that performs a method of outputting quality information.

The sensor data refer to measurement data obtained by a measuring unit (measuring means) such as an X-current sensor 222x, a Y-current sensor 222y, an X-speed sensor 224x, a Y-speed sensor 224y of the head drive unit 232 in FIG. 4, a Z-current sensor 222z, a Z-speed sensor 224z of the plate drive unit 230, an extruder current sensor 222e, or an extruder speed sensor 224e of the filament supplier 226.

In the present disclosure, each layer produced during fabrication is referred to as a fabrication/fabricated layer, an aggregate of plural layers fabricated or produced during fabrication is referred to as a fabricated object, and a structure resulting from the fabrication that has been completed is referred to as a three-dimensional object.

Figure 6:
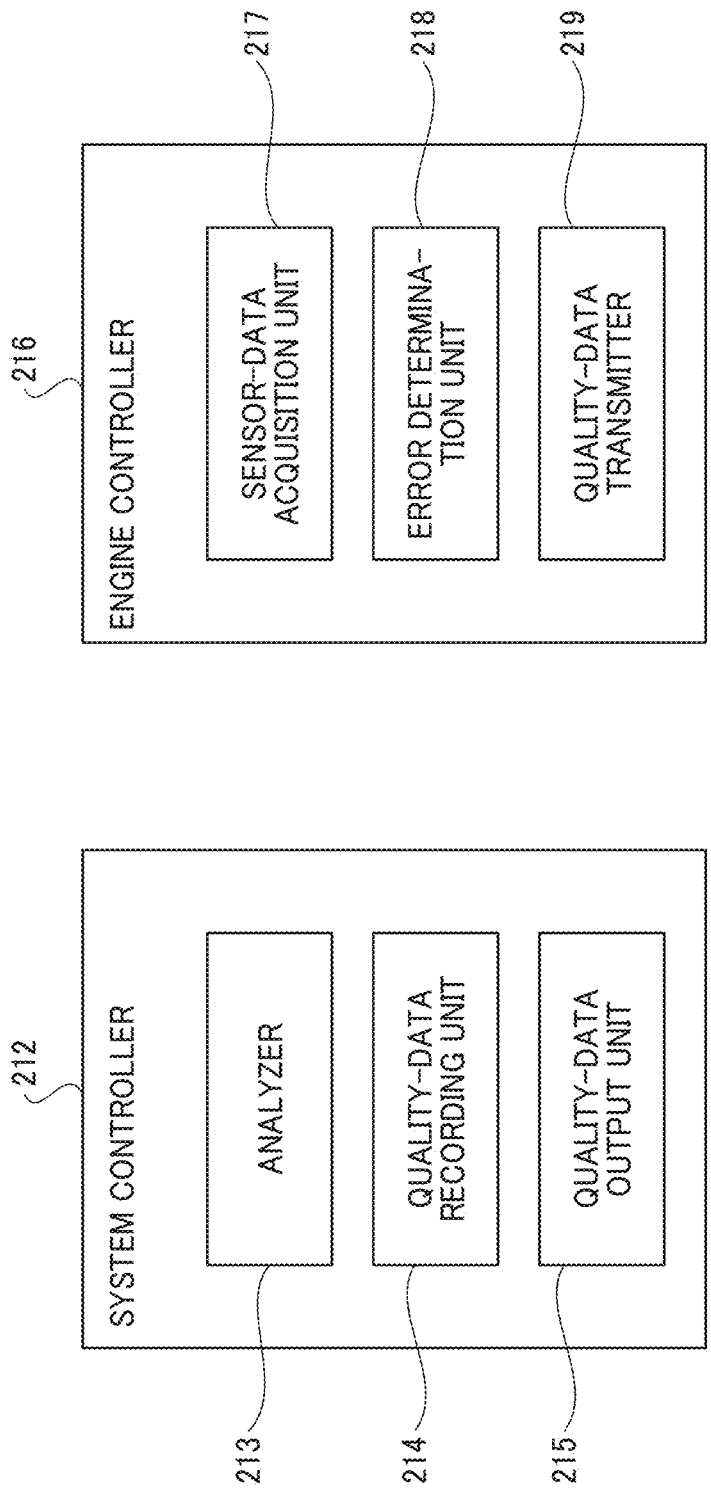
FIG. 6 is a functional block diagram of the controller of the three-dimensional fabrication apparatus according to the embodiment.

In the following description, a functional configuration for fabricating a three-dimensional object while acquiring quality data is described with reference to FIG. 6. FIG. 6 is a functional block diagram of the system controller 212 and the engine controller 216.

As illustrated in FIG. 6, the system controller 212 includes an analyzer 213, a quality-data recording unit 214 (recording means), and a quality-data output unit 215. The engine controller 216 includes a sensor-data acquisition unit 217, an error determination unit 218, and a quality-data transmitter 219.

The engine controller 216 extracts, for analysis, instructions from the control code one by one, received from the system controller 212 to perform a fabrication process. In the present embodiment, the engine controller 216 determines occurrence of an error in the fabrication process, based on sensor data acquired during the fabrication or based on real-time sensor data acquired during the fabrication process.

More specifically, the sensor-data acquisition unit 217 acquires sensor data sets measured by different sensors 220, 222, and 224. Each sensor data set is a time-series data representing measurement values obtained at plural time points by one of the sensors. The sensor-data acquisition unit 217 is an acquisition unit (acquisition means) that acquires the sensor data sets as predetermined information used to fabricate a three-dimensional object.

The error determination unit 218 (determination means) performs simple error determination based on the sensor data acquired by the sensor-data acquisition unit 217. In the simple error determination process, the error determination unit 218 instantaneously determines an error based on the sensor value so as to prevent any danger that might be posed to a user or reduce damage to the machine. To achieve such an error determination, the simple error determination process performed by the error determination unit 218 involves a threshold determination that uses a threshold value for a predetermined sensor value to determine an error or involves the use of a simple determination condition that a predetermined sensor value exceeds a threshold value a prescribed number of times or more, instead of complicated determination by referring to multiple sensor values.

The quality-data transmitter 219 transmits quality data to the system controller 212, in accordance with the sensor data acquired by the sensor-data acquisition unit 217. In the present disclosure, any data relating to quality of the three-dimensional object is collectively referred to as "quality data". The quality data includes sensor data acquired by the sensor-data acquisition unit 217 and a control code used in the process of fabricating a three-dimensional object, which is performed in accordance with each instruction of input control code. The measurement values obtained at one or more time points in the sensor data and the control code or one or more instructions constituting the control code are associated with each other based on time information such as time stamp.

Such an association may be based on time elapsed from a predetermined time point during the fabrication (e.g., a fabrication start point) or information representing the relation between the sensor data and the control code, in addition the above-described time. For the information representing the relation between the sensor data and the control code, sensor data obtained within a frame section in frames with predetermined time intervals, and the control code executed within the frame interval are recorded in association with each other.

The sensor data includes a measurement value of at least one selected from the group consisting of current of one or more motors M of the three-dimensional fabrication apparatus 110, a speed of one or more motors M of the three-dimensional fabrication apparatus 110, and temperature of one or more areas in the three-dimensional fabrication apparatus 110.

FIG. 2 also indicates a configuration of the three-dimensional fabrication apparatus 110 according to another embodiment. The three-dimensional fabrication apparatus 110 includes at least one of an image-capturing device 234 surrounded by broken line and a 3D measuring device 236 surrounded by dot-and-dash line. In such a configuration, the sensor data further includes image data or information of an object being fabricated during the fabrication to be the three-dimensional object, captured and generated by the image-capturing device 234, and 3D measurement data obtained through 3D measurement of the object by the 3D measuring device 236.

Further, the quality data includes, in addition to the sensor data and the control codes, the result of the above-described simple error determination (i.e., error information), setting information of the three-dimensional fabrication, and state information during fabrication. Notably, the setting information of the three-dimensional fabrication apparatus includes the starting time of the fabrication process of the three-dimensional fabrication apparatus; and default speeds, temperatures, and rotating speeds of the devices or units. In some examples, the setting information of the three-dimensional fabrication apparatus includes setting information that has been modified according to an error if the error occurs.

The system controller 212 extracts a control code from the control data 204 and transmits the extracted control code to the engine controller 216. The system controller 212 further receives quality data from the engine controller 216, accumulates the received quality data for subsequent analysis, and analyzes the cause of quality defects. In a cycle longer than the engine controller 216 does, the system controller board 212 acquires, for analysis, sensor data in a longer cycle than the engine controller 216, and generates quality information about an object being fabricated and a structure (i.e., a three-dimensional object) resulting from the completion of the fabrication process.

The analyzer 213 of the system controller 212 analyzes the received quality data to determine whether quality of the fabricated object and the three-dimensional object is acceptable. The quality information representing the determination result for the quality of the three-dimensional object and the determination results of the object being fabricated at different time points during the fabrication are included in the quality data to be accumulated. Notably, such a determination regarding whether the quality of the three-dimensional object is acceptable includes an assessment of quality of the entirety of the three-dimensional object, one or more portions of the three-dimensional object, or a combination thereof. The analyzer 213 is analyzing means.

As described above, the engine controller 216 executes the error determination, which requires instantaneousness. The system controller 212 receives quality data at any desired timing and analyzes the quality data to identify any quality defects. For the quality defects, a phenomenon that may affect fabrication quality is detected, but a mechanical error is disregarded.

The analysis method performed by the analyzer 213 is not particularly limited, but in the embodiments described, involves the use of longer-term information (i.e., information obtained for a longer period of time than information used in the error determination of the error determination unit 218) and more complicated analytical processing than the simple error determination of the error determination unit 218 of the engine controller 216. For example, when the error determination is performed in accordance with a single threshold condition or another threshold condition defined by the number of times in which a threshold condition is satisfied, the error determination uses the logical OR or the logical AND obtained by combinations of the threshold condition for sensor values and another threshold condition for the number of times of such satisfaction. Alternatively, using machine learning or artificial intelligence (AI) technology, patterns observed in sensor data for quality defects are preliminarily learned by a learning model, and the model after learning is used for the determination. What is input to such a condition or a learning model is not limited to the sensor data, and may include an intended control code, the determination results of the engine controller 216, the setting information and state information of the three-dimensional fabrication, the image information, and the 3D measurement data.

The quality-data recording unit 214 receives quality data transmitted from the engine controller 216 and stores the received quality data in the storage unit 211. The quality data to be stored in the storage unit 211 by the quality-data recording unit 214 includes the analytical findings of the analyzer 213.

The quality-data output unit 215 outputs quality information on at least a three-dimensional object to the display device 24 so as to display the information, or to an external device via the communication device 26. Further, the quality-data output unit 215 allows an image forming apparatus such as a printer or a multifunction peripheral (MFP) connected thereto to output such quality information. In some examples, the quality-data output unit 215 outputs all or part of the quality data including the sensor data and the control code, in addition to the quality information of a three-dimensional object. The quality-data output unit 215 is an output unit (output means).

Figure 7:
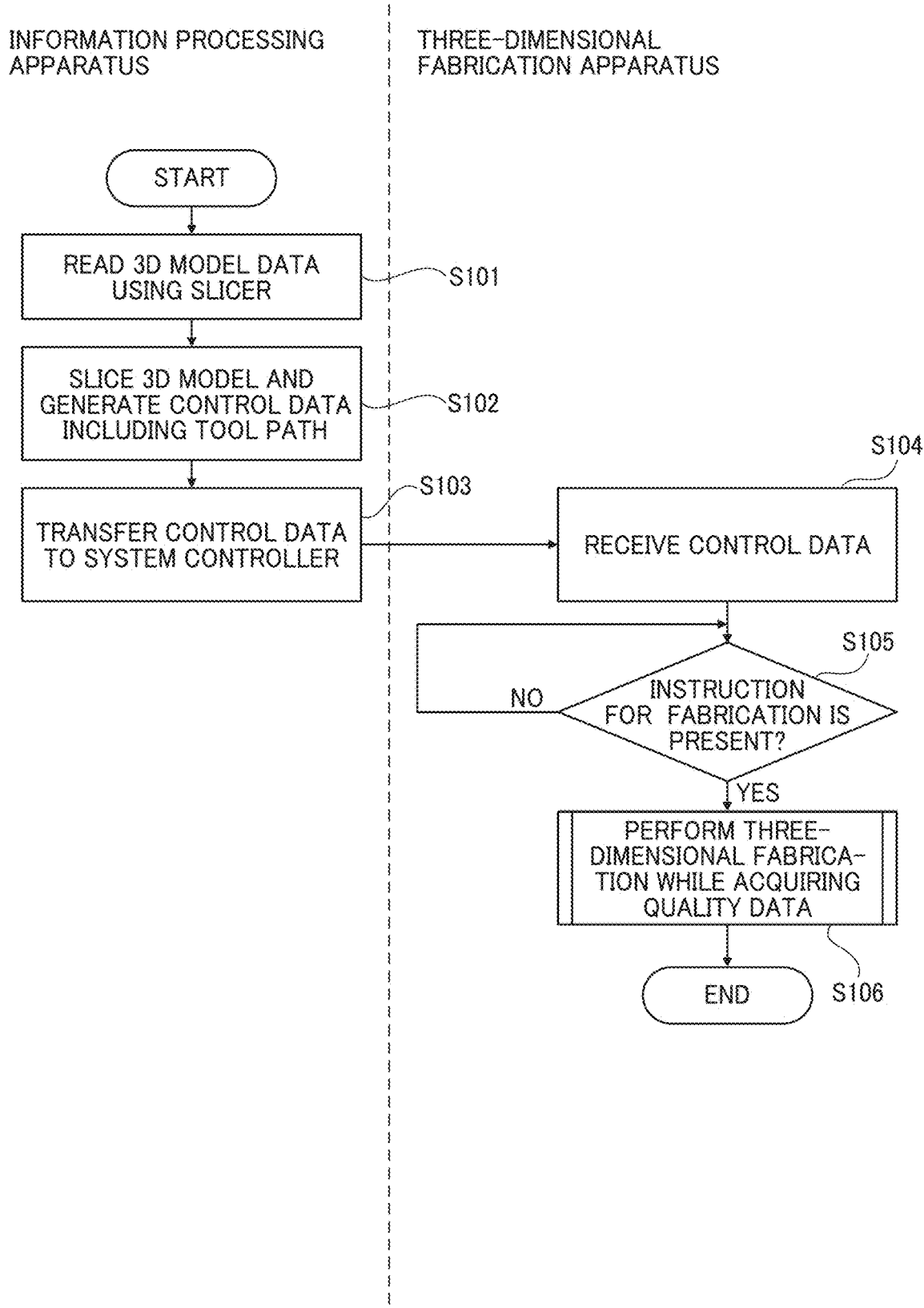
FIG. 7 is a flowchart of a fabrication process performed by the three-dimensional fabrication system according to the embodiment.

Next, a fabrication process performed by a three-dimensional fabrication system 100 according to the first embodiment, with reference to FIG. 7 to FIG. 10B. FIG. 7 is an entire flowchart of the fabrication process performed by the three-dimensional fabrication system 100 according to the first embodiment. FIGS. 8A and 8B indicate a flowchart of a process of performing fabrication while acquiring quality data, performed by the three-dimensional fabrication apparatus 110 according to the first embodiment.

The fabrication process in FIG. 7 starts in response to an instruction of a user. In FIG. 7, the process performed by the information processing apparatus 150 is indicated on the left, and the process performed by the three-dimensional fabrication apparatus 110 is indicated on the right.

In step S101, the information processing apparatus 150 feeds a designated 3D model data 202 into the slicer software 252. The 3D model data 202 is designated in accordance with the instruction of the user at the start of the fabrication process. In step S102, the information processing apparatus 150 slices a 3D model defined by the 3D model data 202 read by the slicer software 252, and generates control data 204 including a tool path. In step S103, the information processing apparatus 150 transmits the control data 204 to the three-dimensional fabrication apparatus 110.

In step S104, the three-dimensional fabrication apparatus 110 receives the control data 204 transmitted from the information processing apparatus 150. In step S105, the three-dimensional fabrication apparatus 110 keeps waiting until it receives an instruction to start the fabrication process input from the user via a touch panel on the three-dimensional fabrication apparatus 110, for example. When the three-dimensional fabrication apparatus 110 has received the instruction from the user (YES in step S105), the process proceeds to step S106. In step S106, the three-dimensional fabrication apparatus 110 performs three-dimensional fabrication while acquiring quality data. Then, the fabrication process ends.

Figure 8B:
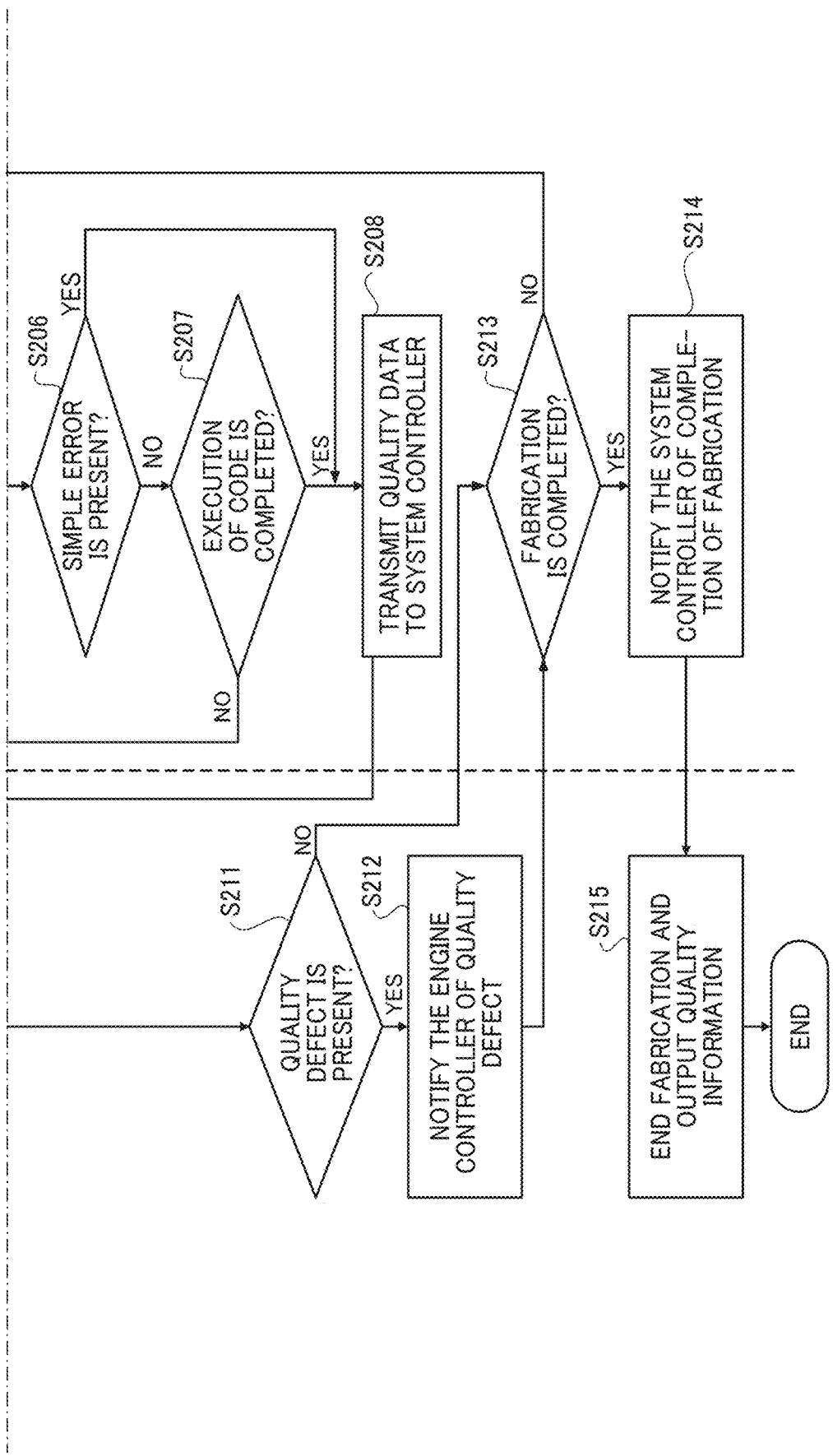

The process illustrated in FIGS. 8A and 8B is invoked by the process of step S106 illustrated in FIG. 7 and starts. FIGS. 8A and 8B indicate the process performed by the system controller 212 of the three-dimensional fabrication apparatus 110 on the left and the process performed by the engine controller 216 of the three-dimensional fabrication apparatus 110 on the right.

In step S201, the system controller 212 transmits the control code to instruct the engine controller 216 to start three-dimensional fabrication. In step S202, the engine controller 216 starts the three-dimensional fabrication. In step S203, the engine controller 216 extracts code to be executed next from the control code.

Figure 9:
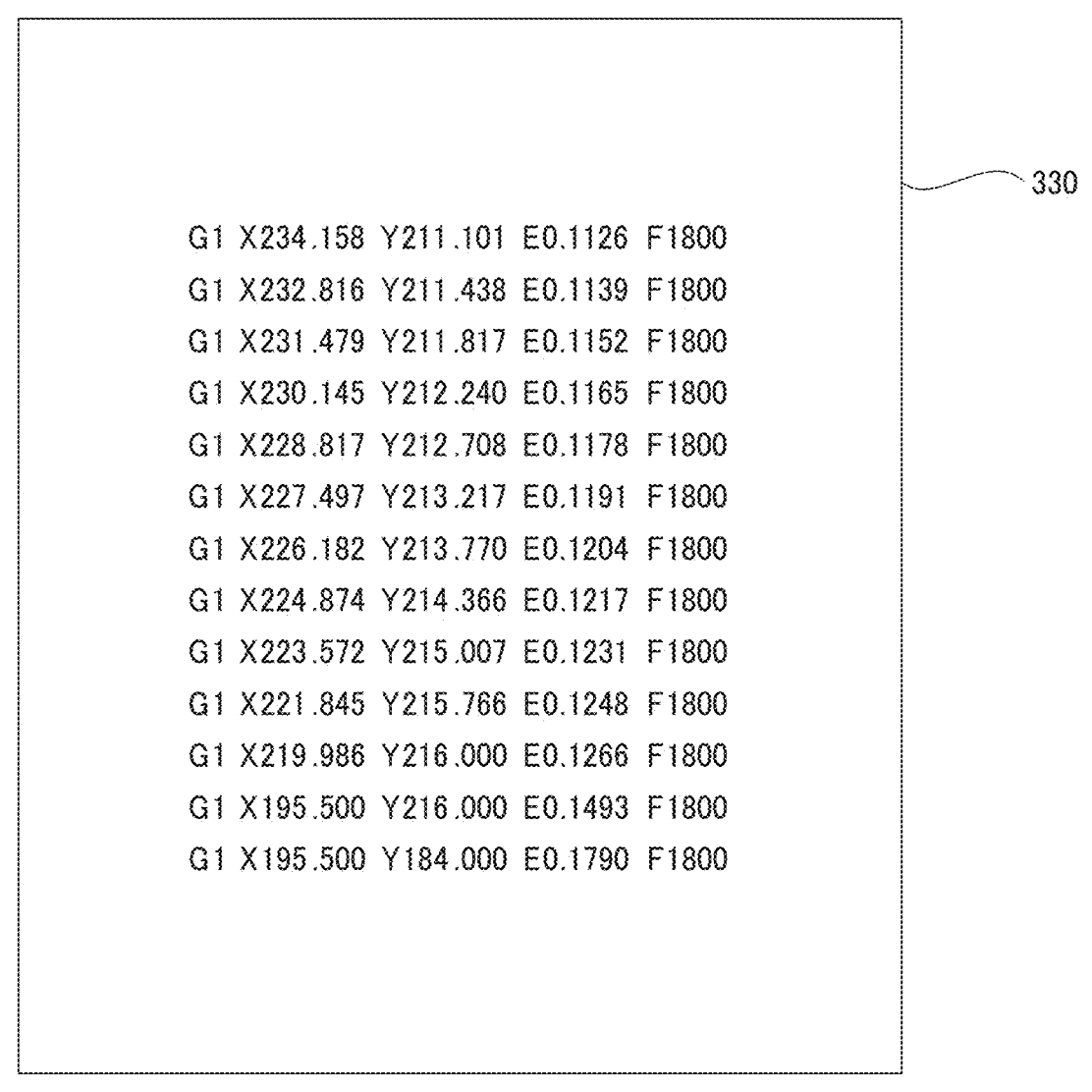

FIG. 9 is an illustration of a data structure including control codes, which is processed by the three-dimensional fabrication apparatus 110 according to the first embodiment. The control code 330 in FIG. 9 includes G codes in rows each constituting one command (instruction). In FIG. 9, G1 is a command to linearly move the nozzle (i.e., the head) from the current position to coordinates (X, Y, Z, and E). In this case, the unit of is millimeters (mm). Further, E denotes one-dimensional coordinates of the filament, and F denotes a moving speed of the head in the unit of mm/minute (min).

Referring back to FIG. 8, in step S204, the engine controller 216 records quality data including a code to be executed and its time, and executes the code. In step S205, during the execution of the code, the engine controller 216 acquires sensor data and records quality data including the acquired sensor data and its time.

In step S206, the engine controller 216 performs the simple error determination. When the engine controller 216 determines that no error is present (NO in step S206), the process proceeds to step S207. In step S207, the engine controller 216 determines whether the execution of the current code is completed. When the engine controller 216 determines that the execution of the current code is not completed yet (NO in step S207), the process returns to the step S205 to continue the acquisition of sensor data. When the engine controller 216 determines that the execution of the current code is completed (YES in step S207), the process proceeds to step S208. Further, when the engine controller 216 determines that an error is present (YES in step S206), the process proceeds to the step S208.

In step S208, the engine controller 216 transmits the recorded quality data to the system controller 212. The quality data includes the control code that has been executed, the sensor data, the simple error determination result, and the time information associated with these dataset.

In step S209, the system controller 212 stores the quality data received from the engine controller 216 in the storage unit 211. In step S210, the system controller 212 performs analysis based on the received quality data, using the analyzer 213. In step S211, based on the analysis result of the step S210, the system controller 212 determines whether any quality defect is present. When the system controller 212 determines that a quality defect is present (YES in step S211), the process proceeds to step S212. In step S212, the system controller 212 notifies the engine controller 216 of the quality defect and proceeds to the process in step S213. When the system controller 212 determines that no quality defect is present (NO in step S211), the system controller 212 notifies the engine controller 216 of the successful quality as appropriate, and the process proceeds to step S213.

In step S213, the engine controller 216 determines whether to end the three-dimensional fabrication. When the engine controller 216 determines not to end the fabrication (NO in step S213), the process returns to the step S203 to execute a process for another code. When the engine controller 216 determines to end the fabrication (YES in step S213), the process proceeds to step S214.

In step S213, when the code that has been executed is final, and no quality defect is notified from the system controller 212, the engine controller 216 determines that the fabrication has been successfully done and ends the fabrication. Further, if an error occurs during the operation of determining whether any error is present based on the sensor values acquired by the engine controller 216, the engine controller 216 transmits quality data to the system controller 212, and the system controller 212 stores the quality data in the storage unit. Then, the determination to end the fabrication is made in step S213, and the fabrication ends. Even if any quality defect is found from the analysis in the step S210, the determination to end the fabrication is made in the step S213, and the fabrication ends.

However, the three-dimensional fabrication apparatus 110 often fabricate plural models at a time. Even if quality defect is found in one fabricated object, the three-dimensional fabrication apparatus 110 preferably continues the fabrication process for another object. When one or more objects are fabricated in parallel, subsequent operations for a certain object that has been found to be defective are cancelled, whereas operations for another object of successful quality are continued. In some examples, with varying degrees of quality, the fabrication process is continued for an object of a slightly lower quality, and the fact about such quality is recorded.

In step S214, the engine controller 216 notifies the system controller 212 of the completion of the fabrication. In step S215, the system controller 212 ends the fabrication and outputs quality information. Then, the process in FIG. 8 ends, and the control is returned to the process in FIG. 7.

As described above, when a three-dimensional object is successfully produced without any quality defects, the system controller 212 outputs quality information indicating that the quality has been accepted. In some examples, when a partially lower quality of the three-dimensional object has been recorded, information indicating such a lower quality is included in the quality information. In addition, when any error or quality defect occurs, and the fabrication of a three-dimensional object is stopped, the system controller 212 outputs quality information indicating that the quality has been rejected. In some examples, such quality information about the rejected quality and also quality data stored (e.g., data obtained around the time of occurrence of the quality defect) are output together.

Notably, the quality information is displayed on a display device, including a touch panel of the three-dimensional fabrication apparatus 110 and a display of the information processing apparatus 150 connected to the three-dimensional fabrication apparatus 110. Alternatively, the quality information is printed as a paper warranty of quality. Still alternatively, an identification medium such as a sheet of an ID tag or a QR (registered trademark) code is attached to a three-dimensional object, and the quality information is included in the identification medium. The quality information is output concurrently with, before, or after notification of the completion of the fabrication.

FIGS. 10A and 10B indicate a table of a data structure of quality data 340 that has been recorded by the three-dimensional fabrication apparatus 110 according to the first embodiment. The quality data 340 in FIGS. 10A and 10B includes time-series datasets acquired in the progress of the fabrication process. The quality data 340 includes a number field 341, a time field 342, a type field 343, a value field 344, and a unit field 345.

The time field 342 lists time information represented by hour: minute: second: millisecond. However, the time may be a timer value with the start of fabrication as a reference (0), or may be the standard time. In the type field 343, various types are input to identify which the record represents a command (i.e., an instruction) or a sensor measurement. The value field 344 lists the contents of the commands or instructions, and sensor measurements. The unit field 345 lists information about the units of the numerical values in the value field 344.

When any fabrication defect occurs, analyzing its cause leads to improvement in productivity of the fabrication process to be performed. The quality data stored in the storage unit 211 includes a sensor data set and one or more control codes for each fabrication process, which can be referred by the system controller 212 in the chronological order. Identifying a location where an error or quality defect has occurred and referring to one or more control codes at the time when the error or quality defect has occurred or in a certain time period before the error or quality defect has occurred enables analysis of what pattern was fabricated when the quality defect has occurred; and how the conditions of the motor and the heaters were at that time. Such an analysis can be performed afterward. Further, the analysis can employ mechanical learning or AI technology.

When the analyzer 213 detects a quality defect during the three-dimensional fabrication, a subsequent operation for a fabricated object that has been found to be defective is cancelled. This prevents a three-dimensional object of defective quality from being produced as a result and also avoid wasted material and time for fabrication, thus providing advantages in cost and productivity.

As described above, the quality data is stored in the storage unit 211 by the system controller 212. In some examples, when stored contents of data become greater, the quality data is stored compressed or data for good quality is deleted and stored. Preferably, the system controller 212 serves as web server or file server to acquire stored quality data via network. For example, the web browser 254 in FIG. 2 is used to access the web server of the system controller 212 of the three-dimensional fabrication apparatus 110 and acquire quality data.

FIG. 11 indicates a table of a data structure of quality data recorded by a three-dimensional fabrication apparatus 110 according to another embodiment of the present disclosure. The quality data 350 in FIG. 11 includes log data 356a to 356d indicating state information during the fabrication, in addition to the quality data 340 in FIG. 10. Such additional log data 350a to 356a enables analysis of causes for an error resulting from software or an error or quality defect, which cannot be found only the sensor data. Associating the sensor data with the operation of software facilitates such an analysis more. This further enables recognition of the state of the engine or the engine controller 216 in text and increases readability of data, possibly improving the user interface. Still further, the sensor information immediately before the occurrence of an error can be obtained, and an error factor can be easily analyzed. Notably, the log information is output in response to the determination of the state of the engine controller 216, including an error determination, and may include an event such as "build Start".

FIG. 12 indicates a table of a data structure of quality data 360 recorded by the three-dimensional fabrication apparatus 110 according to still another embodiment of the present disclosure. The quality data 360 in FIG. 12 includes set-value information 366a and 366b, in addition to the quality data 350 in FIG. 10. The set-value information 366a and 366b is used to analyze the cause of quality defects. In some examples, setting information updated according to an error is recorded if the error occurs. Using such set values for the analysis increases the accuracy of analysis.

Referring to FIGS. 2, 7, 13 to 16, a three-dimensional fabrication system 100 according to a second embodiment is described below. The three-dimensional fabrication apparatus 110 of the three-dimensional fabrication system 100 according to the second embodiment includes the image-capturing device 234 surrounded by broken line in FIG. 2. The same configuration as the first embodiment applies to the second embodiment unless otherwise stated.

Figure 13:
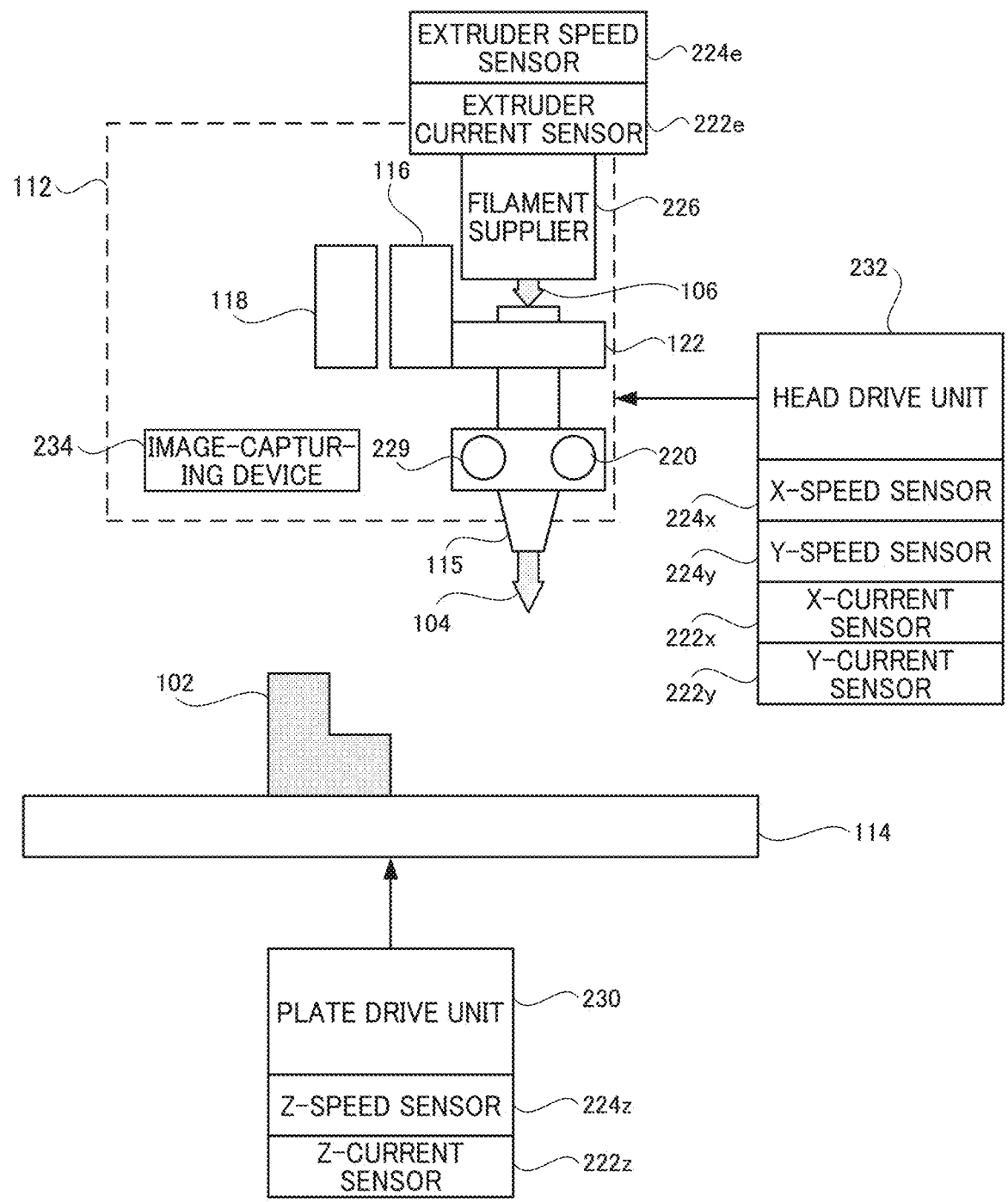
FIG. 13 is an illustration of components around a nozzle of a three-dimensional fabrication apparatus according to another embodiment of the present disclosure.

FIG. 13 is an illustration of components around a nozzle of the three-dimensional fabrication apparatus 110 according to the second embodiment of the present disclosure. The image-capturing device 234, as illustrated in FIG. 13, is provided at the head 112, and captures, from above, an image of a fabricated layer at any desired timing during the fabrication process, thus acquiring image data (i.e., image information) of the surface of the fabricated layer.

Figure 14A:
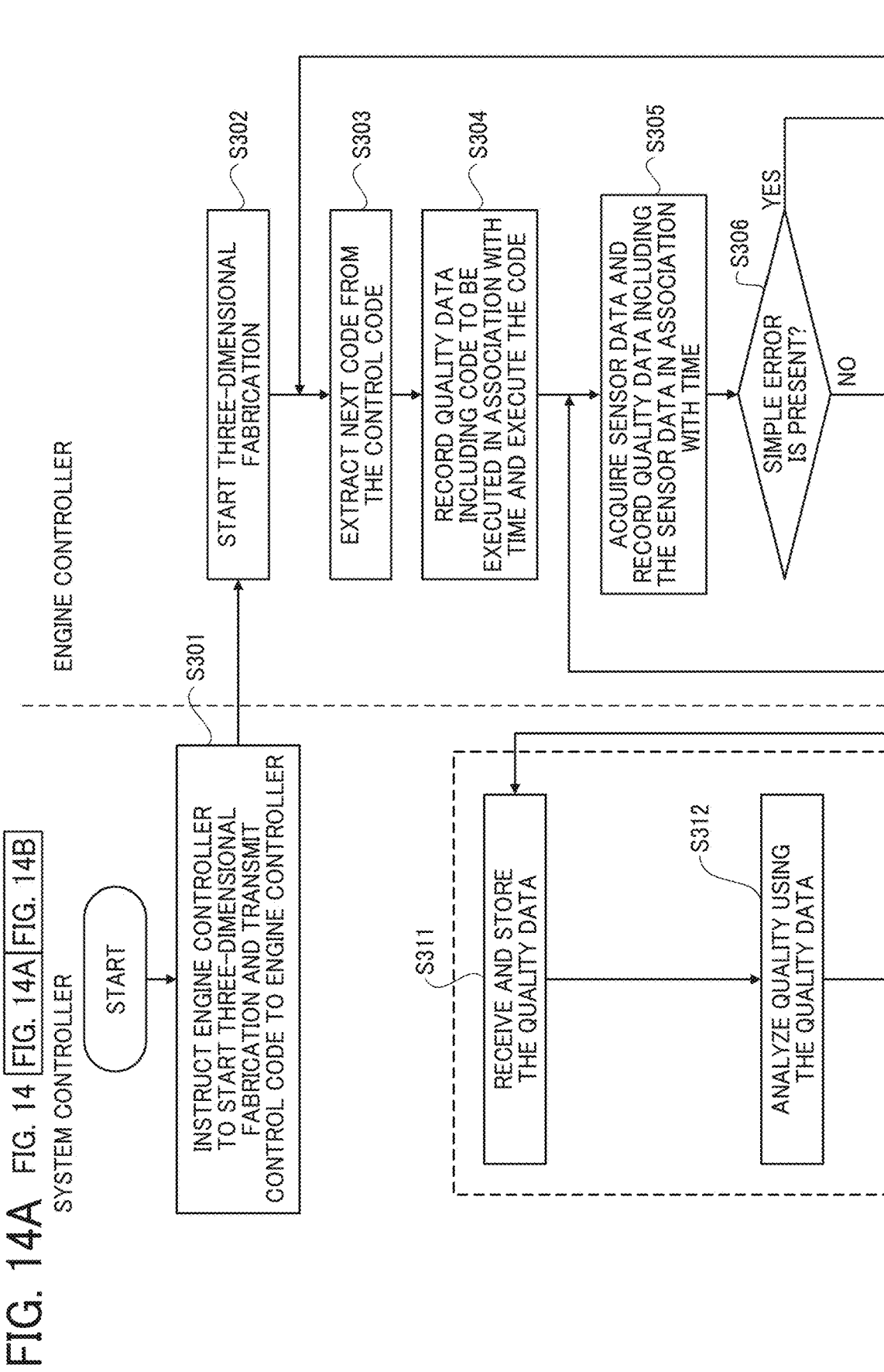
FIGS. 14A and 14B indicate a flowchart of a process of performing fabrication while acquiring quality data, performed by the three-dimensional fabrication apparatus according to another embodiment.
Figure 14B:
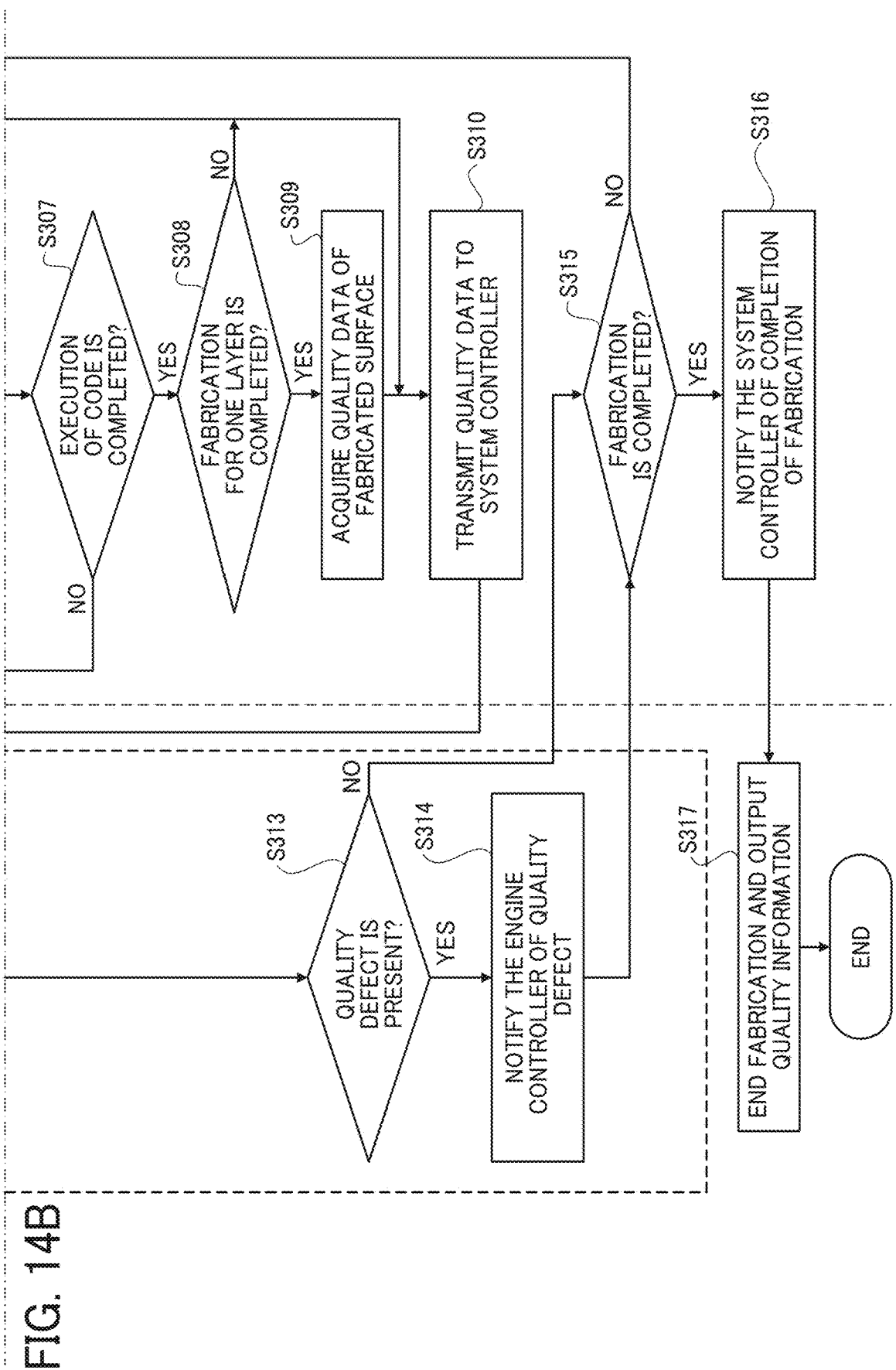

FIGS. 14A and 14B indicate a flowchart of a process of performing fabrication while acquiring quality data, performed by the three-dimensional fabrication apparatus according to the second embodiment. For the entirety of the process as illustrated in FIG. 7, the same process is executed in second embodiment.

The process illustrated in FIGS. 14A and 14B is invoked by the process of step S106 illustrated in FIG. 7 and starts. Same as in FIGS. 8A and 8B, FIGS. 14A and 14B indicate the process performed by the system controller 212 of the three-dimensional fabrication apparatus 8 on the left and the process performed by the engine controller 216 on the right.

The operations in step S301 to step S307 are the same as the operations in step S201 to step S207 in FIGS. 8A and 8B except the operations following YES at the step S306 and the step S307, respectively.

When the engine controller 216 determines that the execution of the code is completed (YES in step S307), the process proceeds to step S308. In step S308, the engine controller 216 determines whether the fabrication of one layer is completed. When the engine controller 216 determines that the fabrication for one layer is completed (YES in step S308), the process proceeds to step S309.

In step S309, the engine controller 216 causes the image-capturing device 234 to capture an image of a surface of a fabricated layer, and acquires image information of the surface being produced, as quality data (i.e., sensor data). In step S310, the engine controller 216 transmits the recorded quality data to the system controller 212. The quality data includes the image information on the surface of a layer that is being fabricated, in addition to the control code that has been executed, the sensor data, and the simple error determination result. Further, when the engine controller 216 determines that an error is present (YES in step S306) and when the engine controller 216 determines that the fabrication of one layer is not completed (NO in step S308), the process proceeds to step S310.

In step S311, the system controller 212 stores quality data received from the engine controller 216, in the storage unit 211. In step S312, the analyzer 213 of the system controller 212 analyzes quality using the received quality data. The analysis in step S312 involves analyzing the image information about the surface of the fabricated layer.

The operations in step S313 to step S317 to END are the same as those in step S211 to step S215 to END in FIG. 8, and the description thereof is omitted.

The flowchart in FIGS. 14A and 14B differs from the flowchart in FIGS. 8A and 8B in that the image-capturing device 234 acquires image data (i.e., image information about the fabricated surface) of a fabricated layer on a layer-by-layer basis, and the system controller 212 performs the analysis using the image information of the fabricated surface to identify a quality defect. Notably, in the present embodiment, any quality defect is identified using the image information of the fabricated surface. For the analysis, the sensor data is combined with the image information in some examples as in FIGS. 8A and 8B.

FIG. 15 indicates a table of a data structure of quality data 370 recorded by the three-dimensional fabrication apparatus 110 according to the second embodiment of the present disclosure. In the second embodiment, the image information is stored as a separate file in the storage unit 211, and the quality data 370 includes the time at which image data has been acquired and a record 376 of an identifier of the image data. In that case, the type indicating "image" is input to the type field 373, and its identifier is input to the value field 374.

Figure 16:
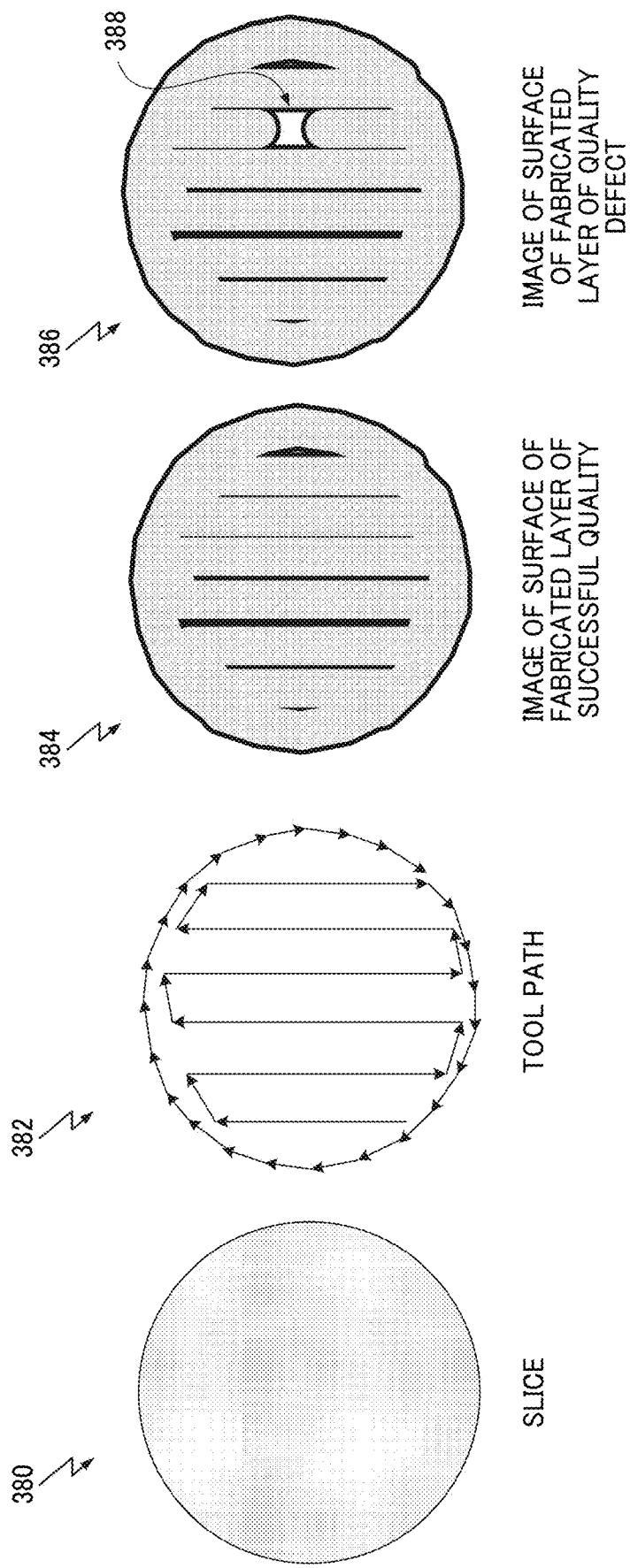
FIG. 16 is an illustration of a process of analyzing image data, performed by the three-dimensional fabrication apparatus according to another embodiment.

FIG. 16 is an illustration of a process of analyzing image data, performed by the three-dimensional fabrication apparatus 110 according to the second embodiment. The analysis involves three-dimensional drawing based on the slice data 380 and the tool-path data 382 described above, and generating image data 384 of the surface of a fabricated layer whose quality is successful as desired. The analysis further involves comparing actually acquired image information 386 of the surface of the fabricated layer with the generated image data 384 of the surface of the fabricated layer of successful quality, so as to determine the quality of the fabricated layer during the fabrication. The actually acquired image information 386 in FIG. 16 observes a defect 388 and identifies a quality defect.

Such an analysis can employ an AI technology such as mechanical learning or neural network. In such a case, however, as analyzing an image needs a large processing load, the logical OR of the threshold conditions for sensor values is used for the analysis of quality defects, and the image information can be stored as evidence to be used by person to determine whether an image includes a defect.

Using the image information for the analysis increases the accuracy of analysis of the causes of a quality defect of a three-dimensional object.

In the second embodiment described with reference to FIGS. 2, 7, 13 to 16, the image-capturing device 234 is used to acquire image information as quality data (i.e., sensor data). In some examples, the three-dimensional fabrication apparatus 110 includes a 3D measuring device 236 surrounded by dot-and-dash line, together with or replaced with the image-capturing device 234. In this case, the quality data (e.g., sensor data) includes 3D measurement data obtained by 3D measuring a fabricated object during the fabrication. The 3D measurement data is used to analyze the quality to identify a quality defect.

The 3D measuring device 236 obtains depth information from a sensor, using stereo vision that employs laser beams and a compound eye. A three-dimensional image can be generated by combining the depth information and the image information. Actually, depth information in two-dimensional coordinates is sufficient to achieve intended performance. For some types of 3D measuring device 236 including an image sensor, the need for the use of the image-capturing device 234 can be eliminated. The three-dimensional measuring device 236 is also provided on the head 112 the same as the imaging device 234 in FIG. 13.

In the above-described second embodiment, the slice data 380 and the tool-path data 382 are used to generate 2D image information 384 of a fabricated surface of successful quality. For the use of the 3D measuring device 236, however, a 3D image is generated. As the image information 386 is also a 3D image actually obtained from a fabricated surface using the 3D measuring device, the actually obtained image information 386 can be compared with the 3D image information 384. To simplify the process, in some examples, only Z values are compared to make a determination by matching XY coordinates of the 3D image (i.e., the image information 384) of successful quality and the 3D image obtained by 3D measurement.

Using the 3D measurement data for the analysis increases the accuracy of analysis of the causes of a quality defect of a three-dimensional object.

Next, a three-dimensional fabrication system 100 according to a third embodiment is described with reference to FIGS. 17 and 18. The three-dimensional fabrication apparatus 110 of the three-dimensional fabrication system 100 according to the third embodiment includes a server 170, in addition to the information processing apparatus 150 and the three-dimensional fabrication apparatus 110 as in FIG. 2. The same configuration as the first embodiment or second embodiment applies to the third embodiment unless otherwise stated.

Figure 17:
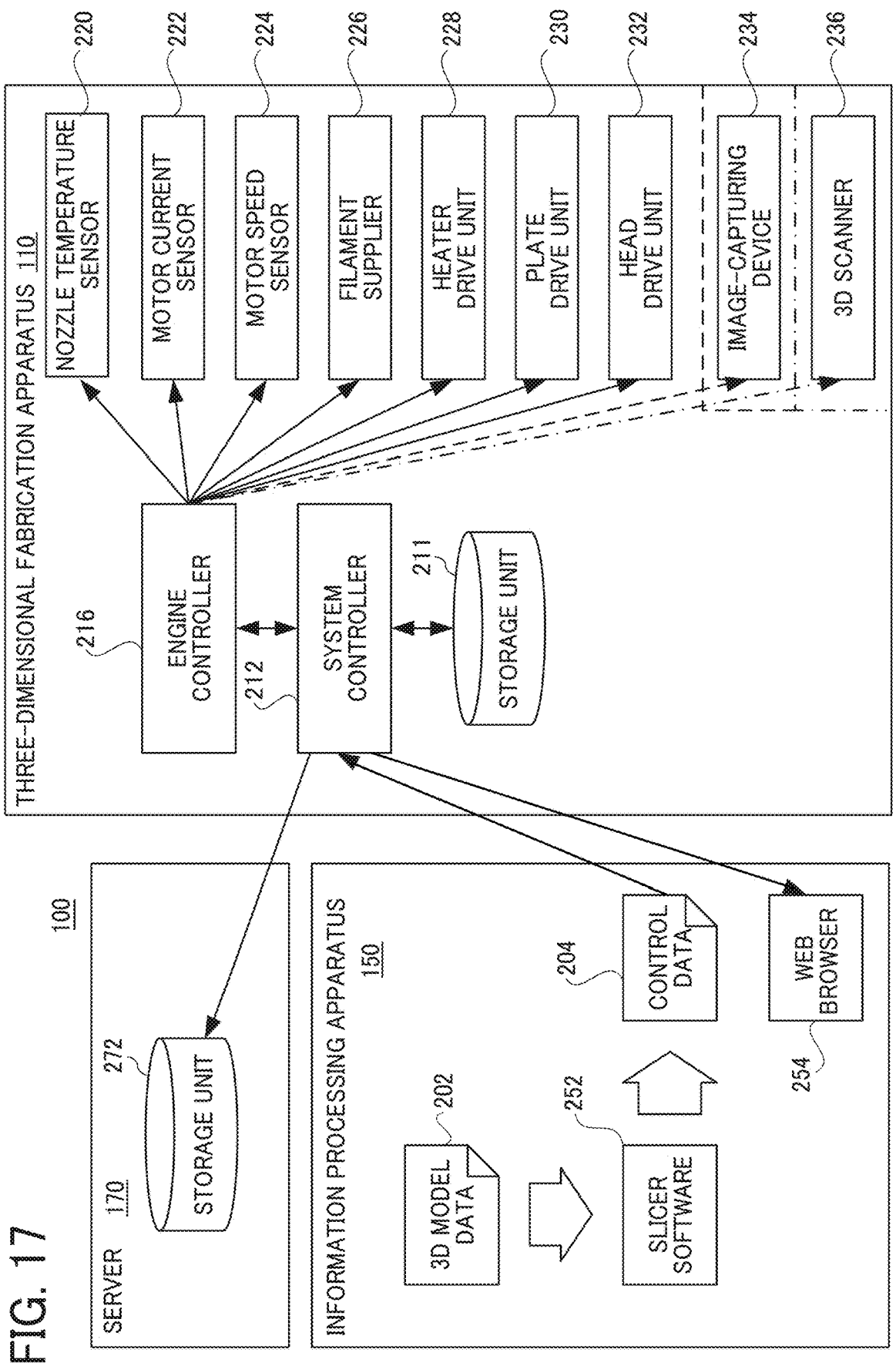
FIG. 17 is an illustration of a system configuration of a three-dimensional fabrication system according to still another embodiment of the present disclosure.

FIG. 17 is an illustration of a system configuration of a three-dimensional fabrication system 100 according to the third embodiment of the present disclosure. The server 170 in FIG. 17 is a server on the cloud or an on-premises server via the Internet, and is connected to the three-dimensional fabrication apparatus 110 via a communication path such as a network. The server 170 has the same hardware configuration as in FIG. 4.

Notably, although the server 170 in FIG. 17 is connected to a single three-dimensional fabrication apparatus 110, in some examples, the server 170 is connected to multiple three-dimensional fabrication apparatuses 110 and collects quality data obtained during the fabrication process performed by the three-dimensional fabrication apparatuses 110, then storing the collected data in the storage unit 272.

In the embodiments described, the quality of an object that is being fabricated is analyzed by the system controller 212 and the server using the quality data as described above to determined whether the quality is defective or successful. The system controller 212 is to have a certain degree of immediacy of analysis, though not as much as the engine controller 216. In contrast, the server 170 needs the accuracy of analysis rather than the immediacy.

Figure 18:
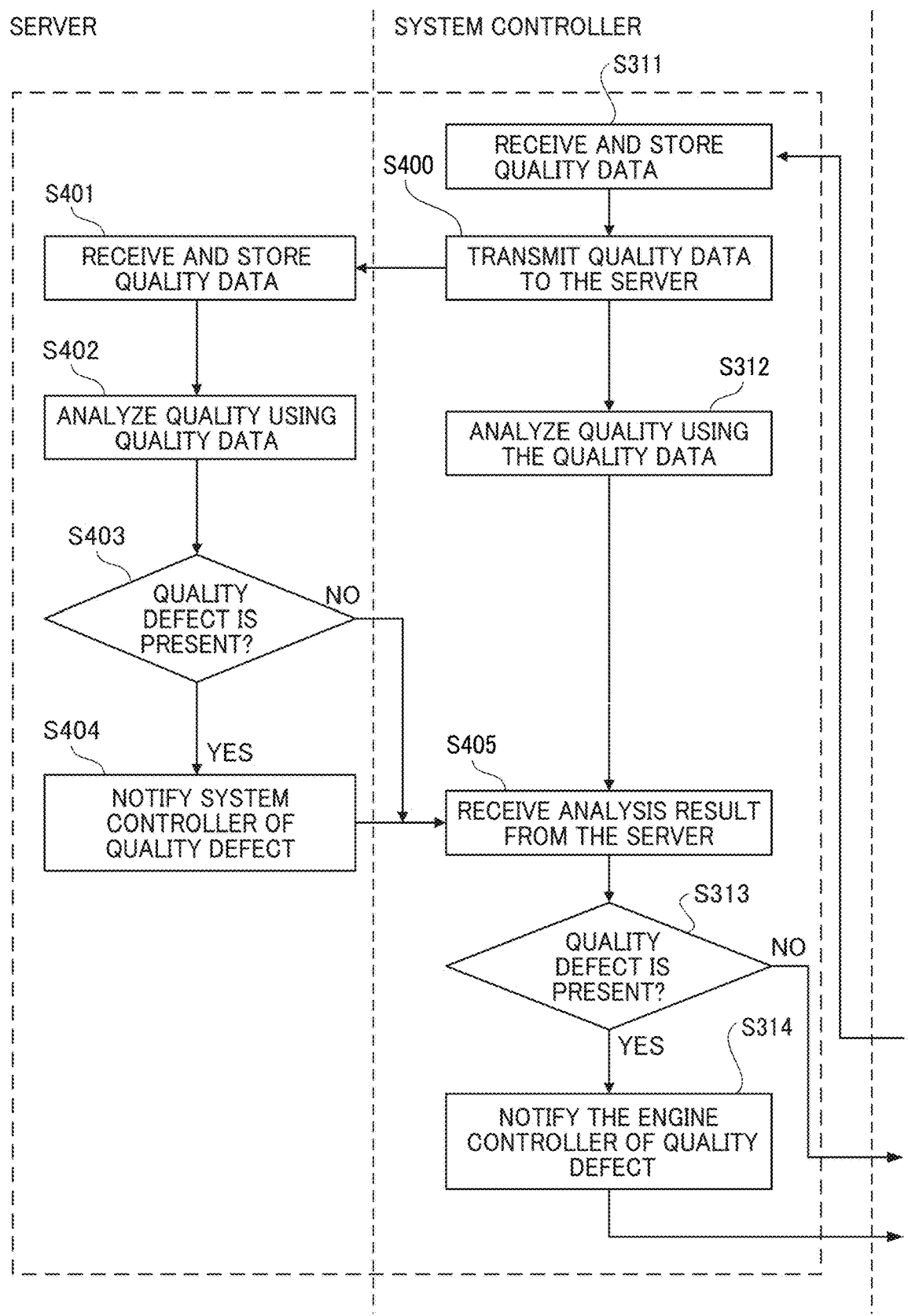
FIG. 18 is a flowchart of a part of a process of performing fabrication while acquiring quality data, which is performed by a three-dimensional fabrication apparatus according to still another embodiments of the present disclosure.

FIG. 18 is a flowchart of a part of a process of performing fabrication while acquiring quality data, which is performed by the three-dimensional fabrication apparatus 110 according to the third embodiment of the present disclosure. The flowchart in FIG. 18 corresponds to the step S311 to step S314 surrounded by broken line in FIGS. 14A and 14B, and is described with reference also to FIGS. 14A and 14B.

When the engine controller 216 transmits quality data to the system controller 212 in step S310, the system controller 212 stores the quality data received from the engine controller 216 in the storage unit 211, in step S311. In step S312, the analyzer 213 of the system controller 212 analyzes quality using the received quality data.

In parallel with the analysis in the step S312 after receiving the quality data, the system controller 212 transmits the received quality data to the server 170 in step S400.

In step S401, the server 170 stores the quality data received from the system controller 212, in the storage unit 272. In step S402, the server 170 performs the analysis based on the received quality data. In some examples, the analytical method in step S402 involves, but not limited to, the use of information whose term is longer than the information used in the analysis of the analyzer 213, and also involves analytical processing more complicated (i.e., more computing resources are used) than the analysis of the analyzer 213.

In step S403, the server 170 determines whether a quality defect is present based on the result of the analysis in step S402. When the server 170 determines that a quality defect is present (YES in step S403), the process proceeds to step S404. In step S404, the server 170 notifies the system controller 212 of the three-dimensional fabrication apparatus 110 of the quality defect. When the server 170 determines that no quality defect is present (NO in step S403), the server 170 notifies the system controller 212 of the successful quality as appropriate.

In step S405, the system controller 212 receives the determination result from the server 170. In step S313, the system controller 212 determines whether a quality defect is present based on the analysis results of the step S312 and the step S402. When the system controller 212 determines that a quality defect is present (YES in step S313), the process proceeds to step S314.

In step S314, the system controller 212 notifies the engine controller 216 of the quality defect, and the process proceeds to the step S315 in FIG. 14B. When the system controller 212 determines that no quality defect is present (NO in step S313, the process proceeds to step S315 in FIG. 14B. Subsequent operations are the same as those in step S313 to step S317 to END are the same as those in step S211 to step S215 to END in FIG. 8 and in step S315 to step S317 to END in FIG. 14B, and the description thereof is omitted.

In the flowchart of FIG. 18 described above, the server 170 performs analysis and provides feedback about the results of the analysis for quality assessment to the three-dimensional fabrication apparatus 11. In some examples, the server 170 stores the analytical results in the storage unit 272 without providing feedback.

The server 170 is employed for more accurate quality assessment and in consideration for deterioration in the three-dimensional fabrication apparatus 110 over time. Further, the server 170 is more likely to be less constrained by the computing resources including storage capacity and calculating capacity than the three-dimensional fabrication apparatus 110 and the information processing apparatus 150. The server 170 can possibly use more resources. The server 170 that uses abundant computational resources enables detailed analysis that the three-dimensional fabrication apparatus 110 cannot achieve.

The sever 170 is in the environment where a lot of information is collectable from plural three-dimensional fabrication apparatuses 110. The sever 170 is suitable particularly for mechanisms that involves learning by machine learning or AI. Further, the server 170 accumulates changes in the same three-dimensional fabrication apparatus 110 over time, and compares the accumulated data with past data. This enables failure diagnosis and pre-detection of failure signs of the three-dimensional fabrication apparatus 110. Such precautionary measures can reduce downtime on the three-dimensional fabrication apparatus 110.

In the above-described embodiment, the quality data includes the setting information of the three-dimensional fabrication and the state information during the fabrication. The setting information and state information are acquired together with their logs using any desired device. A peripheral device connected to the three-dimensional fabrication apparatus 110 and used for each operation step is often manufactured by a manufacturer different from the three-dimensional fabrication apparatus 110. This may make it difficult to acquire information needed for analysis, with the information included in a log.

The following describes a configuration according to a fourth embodiment that enables acquisition of state information and setting information of a peripheral device, as quality data, even in such a case that information needed for analysis is difficult to acquire, with the information being included in a log.

Figure 19:
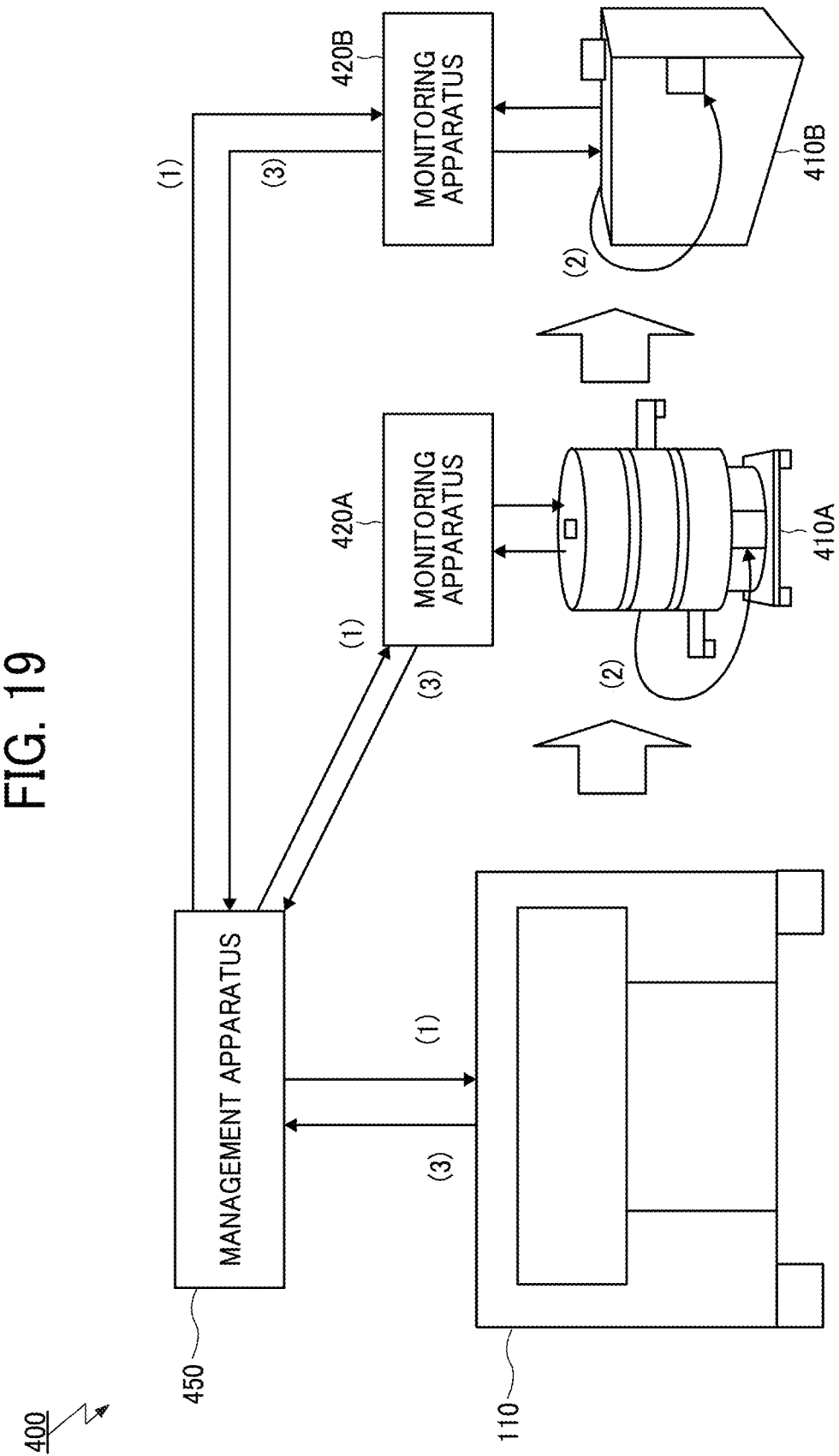
FIG. 19 is an illustration of an entire configuration of a three-dimensional fabrication system according to yet another embodiment of the present disclosure.

FIG. 19 is an illustration of an entire configuration of a three-dimensional fabrication system 400 according to a fourth embodiment of the present disclosure. As illustrated in FIG. 19, the three-dimensional fabrication system 400 includes a three-dimensional fabrication apparatus 110 that fabricates a three-dimensional object, one or more peripheral devices 410A and 410B, one or more monitoring apparatuses 420A and 420B provided for each peripheral device 410, and a management apparatus 450.

The three-dimensional fabrication apparatus 110 receives data used to fabricate a desired three-dimensional object. The peripheral device 410 is connected to and at a subsequent stage of the three-dimensional fabrication apparatus 110, and serves to further process a resultant object produced by the three-dimensional fabrication apparatus 110. The three-dimensional fabrication apparatus 110 and the peripheral devices 410 are connected through a transfer path. Through the transfer path, the resultant object of the three-dimensional fabrication apparatus 110 is transferred to each peripheral device 410.

Examples of the peripheral device 410 include, but not limited to, a solvent drying device, an excess-power eliminator, and a degreasing and sintering device. In some examples, the peripheral device 410 performs any process during or after a three-dimensional fabrication. The peripheral device 410 may be manufactured by a manufacturer different from the three-dimensional fabrication apparatus 110 for each process. However, no limitation is intended therein.

The management apparatus 450, the three-dimensional fabrication apparatus 110, and the monitoring apparatus 420 are connected to each other wired or wirelessly through a network. The monitoring apparatuses 420A and 420B are provided close to the corresponding peripheral devices 410, respectively, and acquire an image of the display unit of the corresponding peripheral device 410 and transmit the information included in the acquired image to the management apparatus 450. The management apparatus 450 acquires from the monitoring apparatus 420 the information, which has been acquired from the corresponding peripheral device 410.

The management apparatus 450 receives quality data output from the three-dimensional fabrication apparatus 110, which is followed by the following: (1) when quality information included in quality data indicates a quality defect, the management apparatus 450 requests setting information and state information from the monitoring apparatuses 420A and 420B of the peripheral devices 410A and 410B connected to the three-dimensional fabrication apparatus 110; (2) the monitoring apparatus 420 acquires an image of a location where setting information appears, including a display and a dial of the peripheral device 410 connected to the monitoring apparatus 420; and (3) the monitoring apparatus 420 transmits the acquired image to the management apparatus 450. The management apparatus 450 stores and manages the received information in association with data input from the three-dimensional fabrication apparatus 110.

Figure 20:
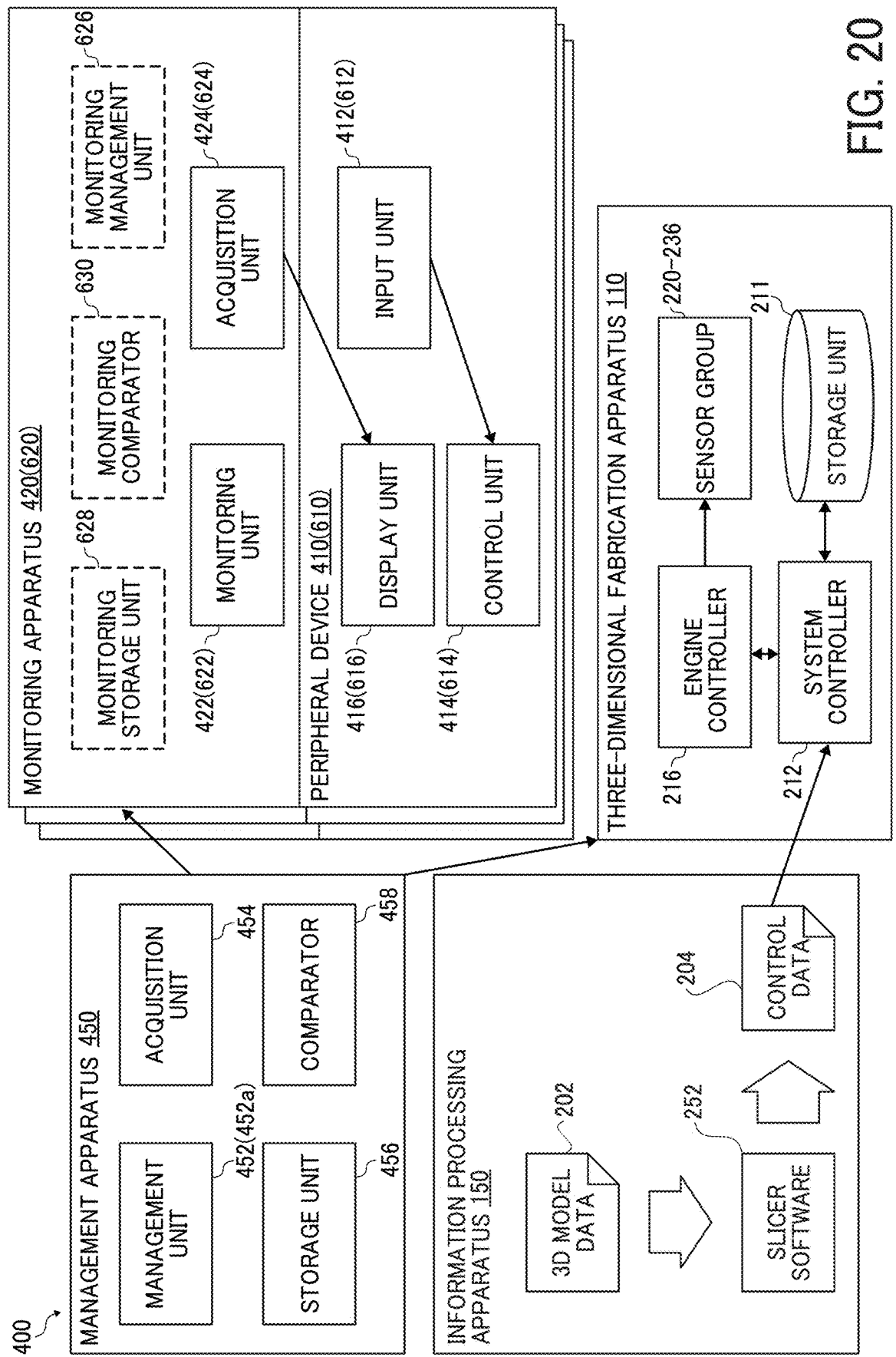
FIG. 20 is a block diagram of a system configuration of the three-dimensional fabrication system according to yet another embodiment of the present disclosure.

FIG. 20 is a block diagram of a system configuration of the three-dimensional fabrication system 400 according to the fourth embodiment of the present disclosure. The three-dimensional fabrication system 400 in FIG. 20 has the same configuration as in FIG. 2. The differences from the three-dimensional fabrication system 100 in FIG. 2 are described below.

As illustrated in FIG. 20, the three-dimensional fabrication system 400 includes a three-dimensional fabrication apparatus 110, an information processing apparatus 150, a peripheral device 410, a monitoring apparatus 420, and a management apparatus 450. Similarly to the first embodiment, the slicer software 252 operates on the information processing apparatus 150. The three-dimensional fabrication apparatus 110 includes a storage unit 211, a system controller 212, an engine controller 216, and different sensors (i.e., a sensor group) 220 to 236. Similarly to the first embodiment, the system controller 212 receives sensor data from the engine controller 216 and analyzes the cause of a quality defect, outputting the analytical result to the management apparatus 450.

The peripheral device 410 further processes an object resulting from the three-dimensional fabrication apparatus 110. More specifically, the peripheral device 410 includes an input unit 412, a control unit 414, and a display unit 416.

The input unit 412 receives input of information for controlling the peripheral device 410. Examples of the information to be input to the input unit 412 include sensor information, information to be input to a control unit, images, and motion detection. In addition to user inputs, information such as detection information is also received from a sensor.

The control unit 414 controls peripheral operations using the information input by the input unit 412. The control unit 414 implements different functions of the peripheral device 410. The peripheral device 410 further includes a degreasing unit and a sintering unit when the peripheral device 410 is a degreasing and sintering device. The control unit 414 also notifies the display unit 416 of the state of the device and the set information.

The display unit 416 displays the state and setting of the peripheral device 410 and a value input from the input unit 412. In the embodiment described, the display unit 416 displays on a display the state of the peripheral device 410 and the setting information input.

The display may be replaced with a physical switch, a dial, or a meter, which allows visual check of the settings or state of the peripheral device 410. The physical switch or dial displays a current set value, and is also used for user inputs and constitutes the input unit 412.

The monitoring apparatus 420 monitors the operation of the peripheral device 410 and acquires the setting information and state information. The monitoring apparatus 420 is provided outside the peripheral device 410 or incorporated in the peripheral device 410. More specifically, the monitoring apparatus 420 includes a monitoring unit 422 and an acquisition unit 424.

The monitoring unit 422 monitors the peripheral device 410 connected to the three-dimensional modeling apparatus 110, and further cooperates with a monitoring apparatus 420 corresponding to the three-dimensional fabrication apparatus 110 or another peripheral device 410. The monitoring unit 422 monitors the peripheral device 410 connected thereto in response to an instruction from the three-dimensional fabrication apparatus 110 or the management apparatus 450.

The acquisition unit 424 acquires as an image the information displayed by the display unit 416 of the peripheral device 410. The method of monitoring and acquiring information involves, but not particularly limited to, capturing a control state of a movable part, its screen and physical switches using a camera, and communication with sensors and devices. Further, the acquisition unit 424 extracts setting information and state information from the acquired image. The acquisition unit 424 serves as an extraction unit. The term "the setting information and the state information" in the present disclosure refers to at least one of the setting information and the state information. Such an extraction process is performed by each monitoring apparatus 420 instead of the management apparatus 450. This configuration enables distribution of the load of storing data and the processing load.

In the embodiment described, the monitoring unit 422 and the acquisition unit 424 of the monitoring apparatus 420 constitute a monitoring unit to monitor the peripheral device 410 and acquire as an image the information displayed by the display unit 416 of the peripheral device 410.

The management apparatus 450 is connected to the three-dimensional fabrication apparatus 110 and the monitoring apparatus 420 of the peripheral device 410, cooperating therewith. More specifically, the management apparatus 450 includes a management unit 452, an acquisition unit 454, a storage unit 456, and a comparator 458.

The management unit 452 is connected to the monitoring apparatus 420 and the three-dimensional fabrication apparatus 110, and receives information from the three-dimensional fabrication apparatus 110, operating and managing the monitoring apparatus 420 of the peripheral device 410. In some examples, the management unit 452 adds at least one of an image and at least one of the setting information and the state information extracted from the image, which are acquired by the acquisition unit 454, to the input data to record and manage the at least one of the image and at least one of the setting information and the state information in association with input data.

The management unit 452 acquires information from multiple monitoring apparatuses 420. The management unit 452 also manages the possible number of pieces of at least one of the setting information and state information to be additionally stored. The management unit 452 also manages the input data by flagging the input data as being a possible quality defect based on the comparison results of the comparator 458, which is described later.

The acquisition unit 454 acquires the images, setting information, and state information acquired by the acquisition unit 424 of the monitoring apparatus 420. For the images acquired, the acquisition unit 454 extracts, from the images, setting information and state information, serving as an extraction unit. The acquisition unit 454 acquires, from the monitoring apparatus 420, information displayed by the display unit 416 of the peripheral device 410.

The storage unit 456 is a nonvolatile memory that stores permissible-range information (i.e., numerical-range information) for each item of the setting information and state information. The comparator 458 compares the values of the setting information and the state information acquired by the acquisition unit 454 with their corresponding permissible ranges stored in the storage unit 466, and notifies the management unit 452 of the comparison result. In some examples, the comparator 458 compares a permissible range with a value for the item of setting information and state information concerned, when the storage unit additionally stores permissible-range information for the item of the setting information and state information concerned.

Figure 21:
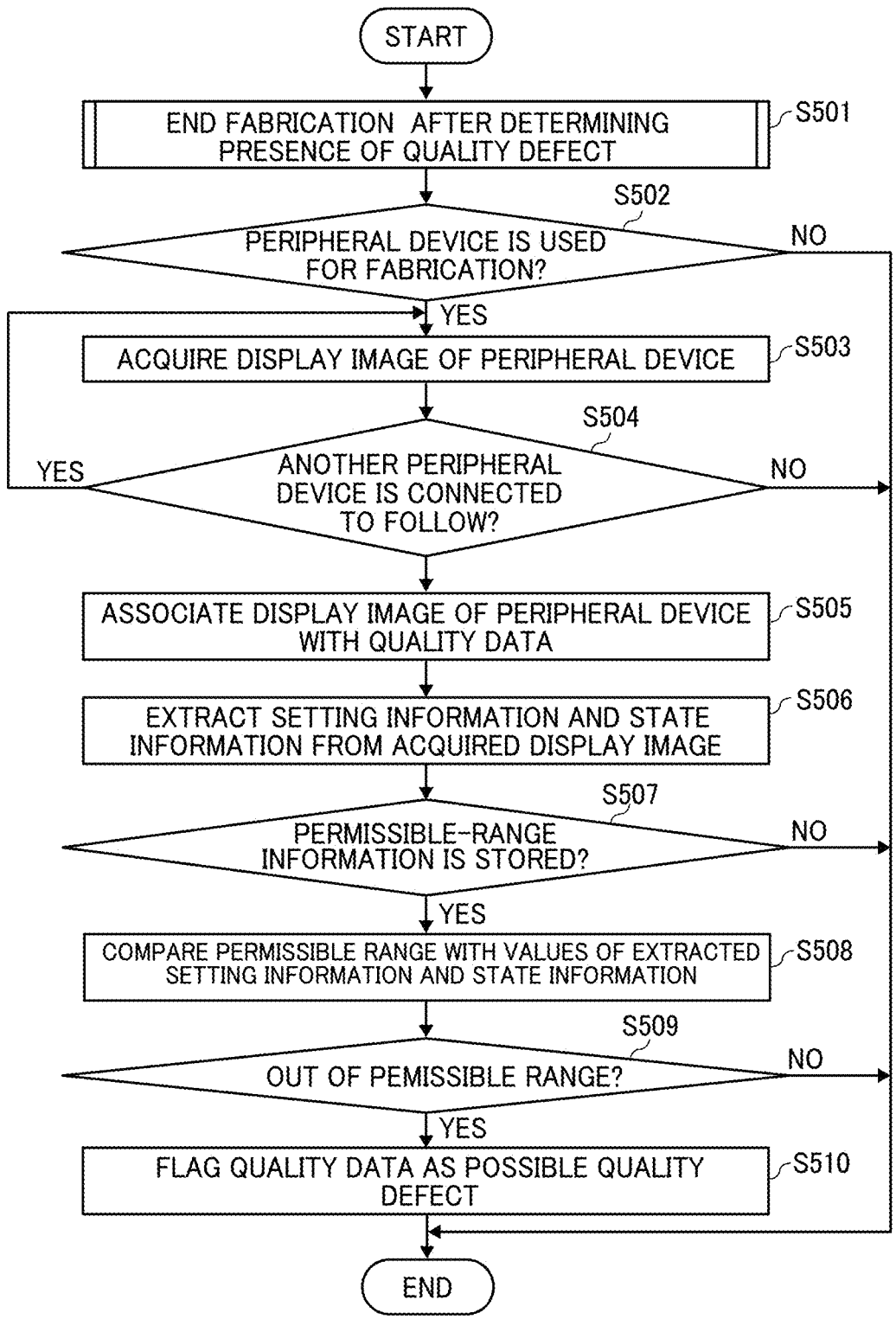
FIG. 21 is a flowchart of a process of acquiring, as quality data, information on a display screen of a peripheral device in the three-dimensional fabrication system according to yet another embodiment.

FIG. 21 is a flowchart of a process of acquiring, as quality data, information on a display screen of the peripheral device 410 in the three-dimensional fabrication system 400 according to the fourth embodiment. In step S501, the following situation is assumed: the fabrication is completed after determining a quality defect is present. Specifically, in step S501, the three-dimensional fabrication apparatus 110 ends fabrication after determining the presence of a quality defect.

In step S502, the management apparatus 450 determines whether a peripheral device 410 (410A) connected to the three-dimensional apparatus 110 is used for fabrication, and the process proceeds according to the determination result. When the management apparatus 450 determines that a peripheral device 410 (410A) is not used for fabrication (NO in step S502), the process ends. When the management apparatus 450 determines that a peripheral device 410 (410A) is used for fabrication (YES in step S503), the process proceeds to step S503.

In step S503, the management apparatus 450 requests and acquires an image displayed by the display unit 416 of the peripheral device 410, from the monitoring apparatus 420. In step S504, the management apparatus 450 determines whether another peripheral device 410 is connected to follow. When the management apparatus 450 determines that another peripheral device 410 (410B) is connected to follow (YES in step S504), the process returns to step S503. This operation is repeated until the management apparatus 450 acquires an image displayed by the display unit 416 of the final peripheral device 410 that follows. When the management apparatus 450 determines that no peripheral device 410 is connected to follow (NO in step S504), the process proceeds to step S505. In step S505, the management apparatus 450 associates the images (i.e., display images) displayed by the display unit 416 of the peripheral devices 410 acquired so far, with the quality data. Such association of quality data, or input data, with the acquired images possibly increases the speed for analysis of the quality defect identified. In step S506, the management apparatus 450 extracts setting information and state information from the acquired display images.

Figure 22A:
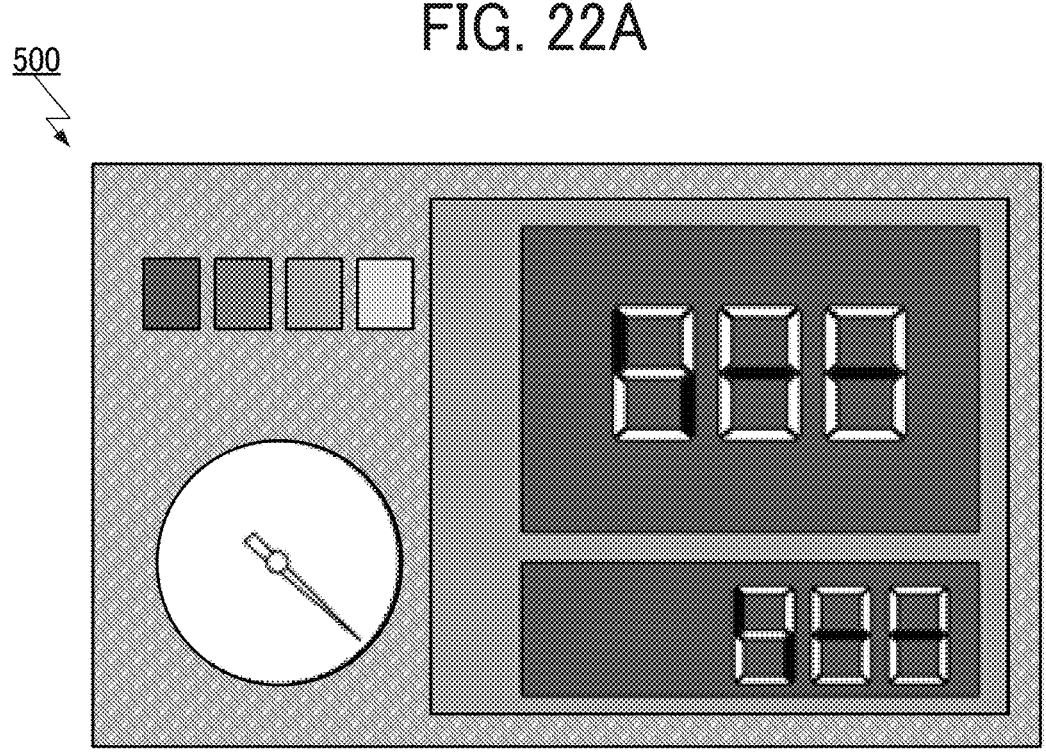
FIGS. 22A and 22B are illustrations for describing a process of extracting setting information from an image displayed by a display unit in the three-dimensional fabrication system according to yet another embodiment.
Figure 22B:
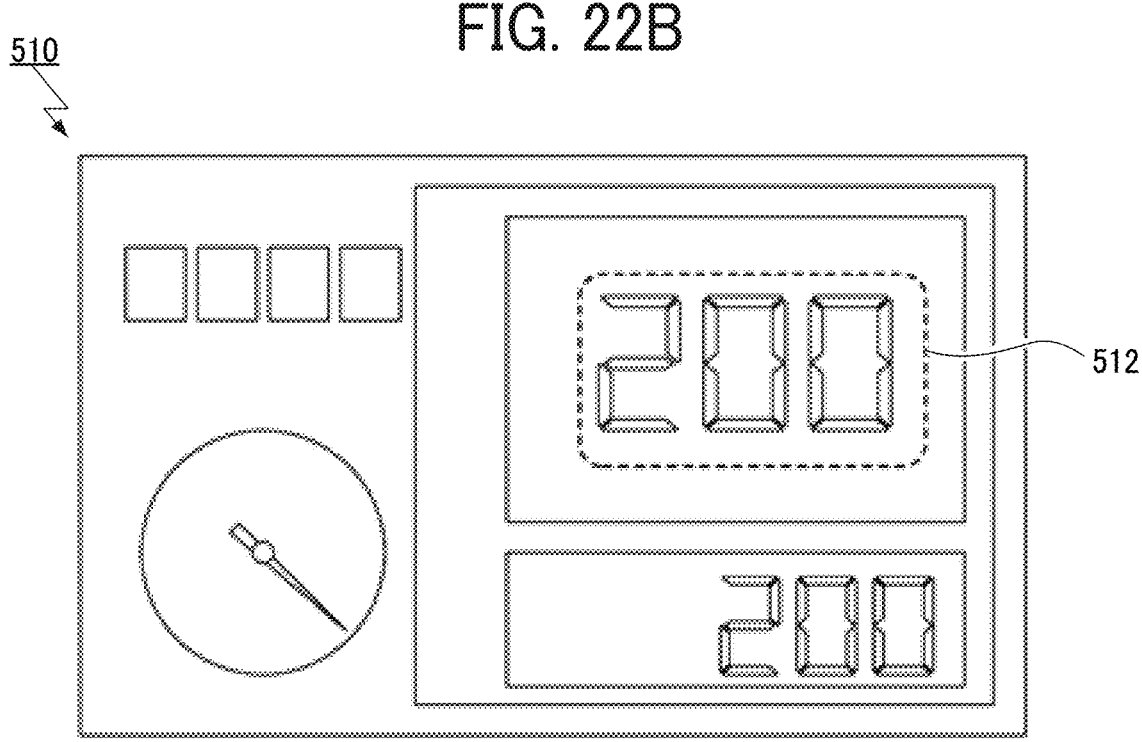

FIGS. 22A and 22B are illustrations for describing a process of extracting the setting information from a display image acquired from the peripheral device 410 in the three-dimensional fabrication system 400 according to the fourth embodiment. An image 500 in FIG. 22A, which is displayed by the display unit 416 in the peripheral device 410, is acquired by the management apparatus 450. Examples of the display unit 416 includes a liquid crystal display, a physical switch, a dial, and a meter. A camera is used to capture an image (i.e., a display image to be displayed by such a display unit 416), which is acquired by the management apparatus 450. The image 500 in FIG. 22A is processed to obtain a processed image 510 as illustrated in FIG. 22B. The processed image 510 allows reading of a setting item and a set value 512 included in the image 510.

The setting information includes a value settable in the peripheral device, including temperature and time. The state information includes a numerical value indicating the state of the peripheral device, including the current temperature and the operating value. Notably, although the method of extracting information from the acquired images is not particularly described in the above-described embodiment, any known technique is applicable on the monitoring apparatus 420 or the management apparatus 450. The configuration according to the fourth embodiment that acquires a display image of the peripheral device enables acquisition of information from the acquired display image, thus acquiring information needed for analysis, which is difficult to obtain as a log. This further facilitates identifying of the cause of an identified quality defect being analyzed. Further, the configuration according to the fourth embodiment that transforms images into numerical values can reduce efforts needed to deal with the use of analysis software as an analysis tool.

In step S507, the management apparatus 450 determines whether permissible-range information (i.e., numerical-range information) is stored. In this case, permissible-range information for each item of the setting information and the state information is to be preliminarily stored in the management apparatus 450 and the monitoring apparatus 420. When the management apparatus 450 determines that no permissible-range information is stored (NO in step S507), the process ends. When the management apparatus 450 determines that the permissible-range information is stored (YES in step S507), the process proceeds to step S508.

In step S508, the management apparatus 450 compares a value of the extracted setting information and state information with the permissible range stored. In step S509, the management apparatus 450 determines whether the value of the extracted setting information and state information is out of the permissible range based on the comparative result. When the management apparatus 450 determines that the extracted setting information and state information is within the permissible range (NO in step S509), the process ends. When the management apparatus 450 determines that the value of the extracted setting information and state information is out of the permissible range (YES in step S509), the process proceeds to step S510.

In step S510, the management apparatus 450 flags quality data corresponding to the information determined to be out of permissible range to indicate a possible quality-defect cause of the identified quality defect. Then, the process ends. Notably, a permissible range may be stored in association with each of the setting information and the state information acquired. Any information with out-of-range value is determined to be possibly a cause of the identified quality defect, and quality data corresponding to the information determined to be a possible cause of the identified quality defect is flagged as a possible quality-defect cause, or simply as a possible quality defect. This facilitates identifying of causes of quality defects, which might be a user's operation error or setting error.

Hereinafter, a process of comparing a set value with numerical ranges is described with reference to FIG. 23. FIG. 23 is an illustration of a table for describing a process of comparing a value of the extracted setting information and state information with a numerical range in the three-dimensional fabrication system 400 according to the fourth embodiment. As illustrated in FIG. 23, the items of the setting information and state information each include a maximum value, a minimum value, and a permissible value, which are stored in the management apparatus 450 and the monitoring apparatus 420. Any quality data for a stored value that meets any of the following conditions is flagged as being a possible quality defect, or a possible quality-defect cause:

(1) an acquired set value of the setting information and state information is greater than the maximum value;
(2) an acquired set value of the setting information and state information is less than the minimum value; and
(3) an acquired set value of the setting information and state information is different from the permissible value.

Notably, the table in FIG. 23 is only one example, and specific set values and numerical values for the state of some items of the setting information and the state information may be other values. In some examples where the management apparatus 450 performs such a comparison, a numerical-range information (i.e., permissible-range information) as described above is stored for each combination of a peripheral device 410 and a monitoring apparatus 420.

Figure 24:
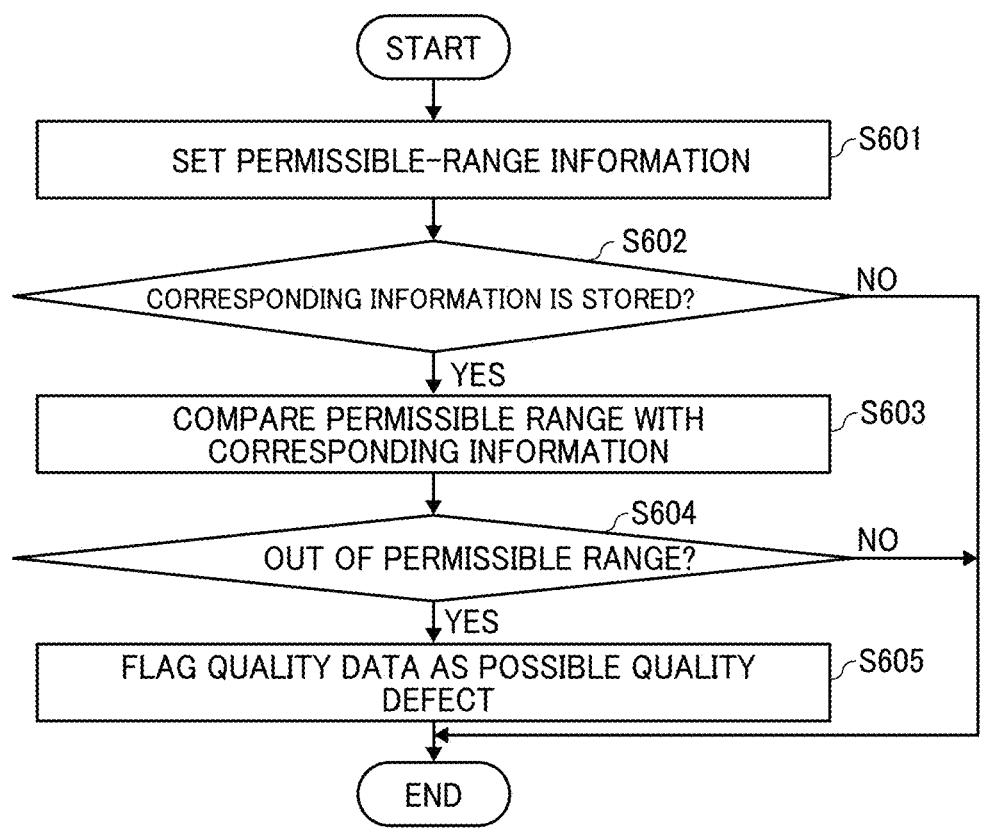
FIG. 24 is a flowchart of a process of comparing the setting information and state information with numerical-range information in the three-dimensional fabrication system according to yet another embodiment.

FIG. 24 is a flowchart of a process of comparing the setting information and state information, with numerical-range information, in the three-dimensional fabrication system 400 according to the fourth embodiment. For the process in FIG. 21, such numerical-range information (i.e., permissible-range information) is preliminarily stored before acquiring any setting information and state information. If the numerical-range information is not stored when the setting information or the state information is acquired, the process in FIG. 24 is performed to compare the setting information and state information with numerical-range information once the numerical-range information gets stored.

After the process in FIG. 24 starts, the management apparatus 450 sets permissible-range information for setting information and state information in step S601. In step S602, the management apparatus 450 determines whether setting information and state information concerned is stored. When the management apparatus 450 determines that the information concerned is not stored (NO in step S602), the process ends. When the management apparatus 450 determines that the information concerned is stored (YES in step S602), the process proceeds to step S603.

In step S603, the management apparatus 450 compares a value of an item of the setting information and device state information concerned, with the stored permissible-range information. In step S604, the management apparatus 450 determines whether the value is out of the permissible range based on the comparative result. When the management apparatus 450 determines that the value is within the permissible range (NO in step S604), the process ends. When the management apparatus 450 determines that the value is out of the permissible range (YES in step S604), the process proceeds to step S605. In step S506, the management apparatus 450 flags quality data corresponding to the information determined to be out of permissible range as being a potential quality defect to indicate a potential defect.

In such a manner, the comparator 458 compares a permissible range with a value for an item of at least one of the setting information and state information concerned when the storage unit 456 additionally stores permissible-range information for the item of at least one of the setting information and state information concerned, and flags quality data for the information whose item has a value determined to be out of the permissible range, as being a possible quality defect. Already-stored setting information or state information can also be compared with a permissible range in such a manner. This facilitates the finding of patterns of erroneous setting or set values of permissible ranges.

Figure 25:
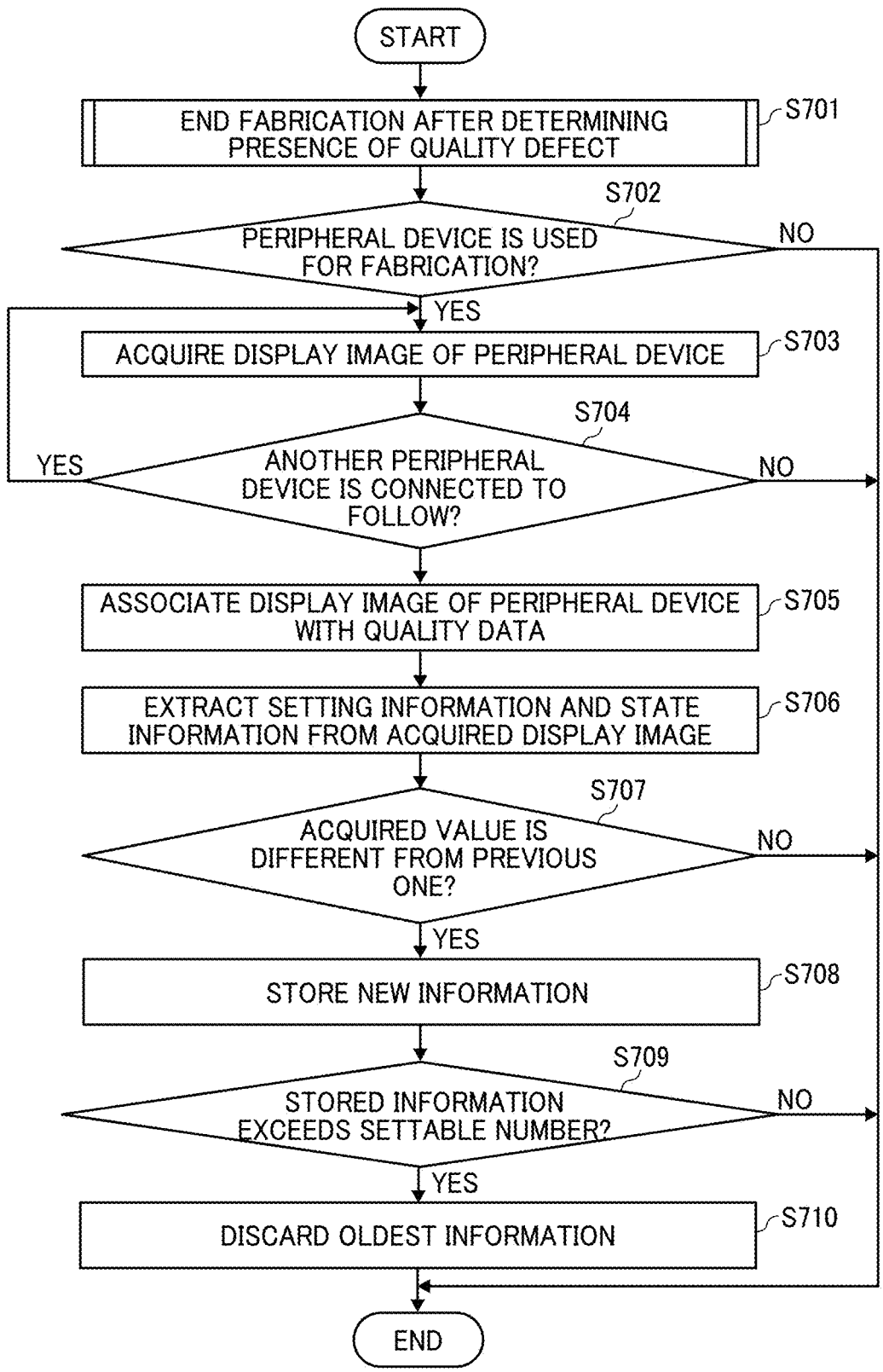
FIG. 25 is a flowchart of another process of acquiring, as quality data, information on the display screen of the peripheral device in the three-dimensional fabrication system according to yet another embodiment.

Another process of acquiring, as quality data, information on a display screen of a peripheral device is described with reference to FIG. 25. FIG. 25 is a flowchart of another process of acquiring, as quality data, information on a display screen of a peripheral device in the three-dimensional fabrication system 400 according to the fourth embodiment.

In step S701, the following situation is assumed: the fabrication is completed after determining a quality defect is present. Specifically, in step S701, the three-dimensional fabrication apparatus 110 ends fabrication after determining the presence of a quality defect. In step S702, the management apparatus 450 determines whether any peripheral device 410 is used for fabrication, and the process proceeds according to the determination result. When the management apparatus 450 determines that a peripheral device 410 is not used for fabrication (NO in step S702), the process ends. When the management apparatus 450 determines that a peripheral device 410 is used for fabrication (YES in step S702), the process proceeds to step S703.

In step S703, the management apparatus 450 requests and acquires an image displayed by the display unit 416 of the peripheral device 410, from the monitoring apparatus 420. In step S704, the management apparatus 450 determines whether another peripheral device 410 is connected to follow. When the management apparatus 450 determines that another peripheral device 410 (410B) is connected to follow (YES in step S704), the process returns to step S703. When the management apparatus 450 determines that no peripheral device 410 is connected to follow (NO in step S704), the process proceeds to step S705. In step S705, the management apparatus 450 associates the images (i.e., display images) displayed by the display unit 416 of the peripheral devices 410 acquired so far, with the quality data. In step S706, the management apparatus 450 extracts setting information and state information from the acquired display images.

In step S707, the management apparatus 450 determines whether the acquired numerical value is different from previous numerical value. In this case, the previous numerical value is assumed to have already been stored in the management apparatus 450 and the monitoring apparatus 420. When the management apparatus 450 determines that the acquired numerical value is the same as the previous numerical values (NO in step S707), the process ends. When the management apparatus 450 determines that the acquired numerical value is different from the previous numerical values (YES in step S707), the process proceeds to step S708.

In step S708, the management apparatus 450 stores the extracted setting information and state information in the storage unit 456. In step S709, the management apparatus 450 determines whether the number of pieces of stored information exceeds the maximum number of pieces of information to be set. When the management apparatus 450 determines that the number of pieces of stored information does not exceed the maximum number of pieces of information to be set (NO in step S709), the process ends. When the management apparatus 450 determines that the number of pieces of stored information exceeds the maximum number of pieces of information to be set (YES in step S709), the process proceeds to step S710. In step S710, the management apparatus 450 discards the oldest information, and ends the process.

FIGS. 26A and 26B are illustrations for storing a process of storing and discarding the extracted setting information in the three-dimensional fabrication system 400 according to the fourth embodiment. As illustrated in FIGS. 26A and 26B, the values of the items of the acquired setting information and state information are stored in the management apparatus 450 and the monitoring apparatus 420. Two different configurations to store values are illustrated in FIGS. 26A and 26B. In the configuration in FIG. 26A, all pieces of the setting information and state information are stored in association with their date and time when a value for any one of the items of the setting information and state information of the peripheral device 410 is different from the previous stored value. In the configuration in FIG. 26B, any value that is different from the previous stored value is stored in association with its date and time, for each item of the setting information and state information of the peripheral device 410 (e.g., the item of temperature is indicated in FIG. 26B).

The configuration of FIG. 26A allows easy understanding of information for each state of the peripheral device 410. However, if a value of any item of the setting information and state information frequently changes, update frequency of the stored data might increase, and even some data, which may be desired to be referred to later, is more likely discarded. In contrast, the configuration of FIG. 26B stores data for each item of the setting information and state information, and cause a need to compare between each data and its date and time to check information for each state of the peripheral device 410. The configuration of FIG. 26B, however, can more likely store values without being affected by the presence of any set value being updated frequently. Which one of the above-described configurations to adopt and the possible number of datasets to store are variable according to system capacity such as storage capacity and data acquisition rate, or may be selected by a user. Such a manner to set the possible number of datasets to store according to device specs or a user's selection enables multiple datasets to be stored.

To achieve the above-described configuration to store data, the management unit 452 includes a determination unit 452a that determines whether at least one of the acquired setting information and state information is changed. When the management unit 452 determines that at least one of the setting information and the state information is changed, the management unit 452 manages at least one of the setting information and the state information, which is changed, together with the stored setting information and state information. Obtaining a difference from the changed information facilitates identifying of the cause for a quality defect. Alternatively, in stead of obtaining such a difference, only a final image may be stored.

The three-dimensional fabrication system 400 according to the fourth embodiment enables acquisition of the setting information and state information of a peripheral device 410, as quality data, even in a case that information needed for analysis is difficult to acquire as a set of information in a log. This enables acquisition of setting information of the control unit and analysis of the causes of quality defects. Further, acquiring display images from the multiple peripheral devices 410 and extracting information from the acquired display images enables acquisition of information needed for the analysis, even from any device that fails to provide such information in logs and any device unconnected to the three-dimensional fabrication apparatus 110 via a network.

In the three-dimensional fabrication system 400 according to the fourth embodiment, the management apparatus 450 receives quality information output from the three-dimensional fabrication apparatus 110, and collects and manages the images displayed by the display unit 416 of the peripheral device 410 and information extracted from the display image. In the configuration according to the fourth embodiment, the management apparatus 450 includes an acquisition unit (454) that acquires information from multiple peripheral devices 410 and monitoring devices 420; and a management unit (452) that manages the acquired information.

In another embodiment, a display image or information extracted from the display image is managed in association with quality data without the use of a separate management apparatus 450. Hereinafter, a three-dimensional fabrication system 600 without a separate management apparatus 450 is described according to a fifth embodiment with reference to FIGS. 20 and 27.

Figure 27:
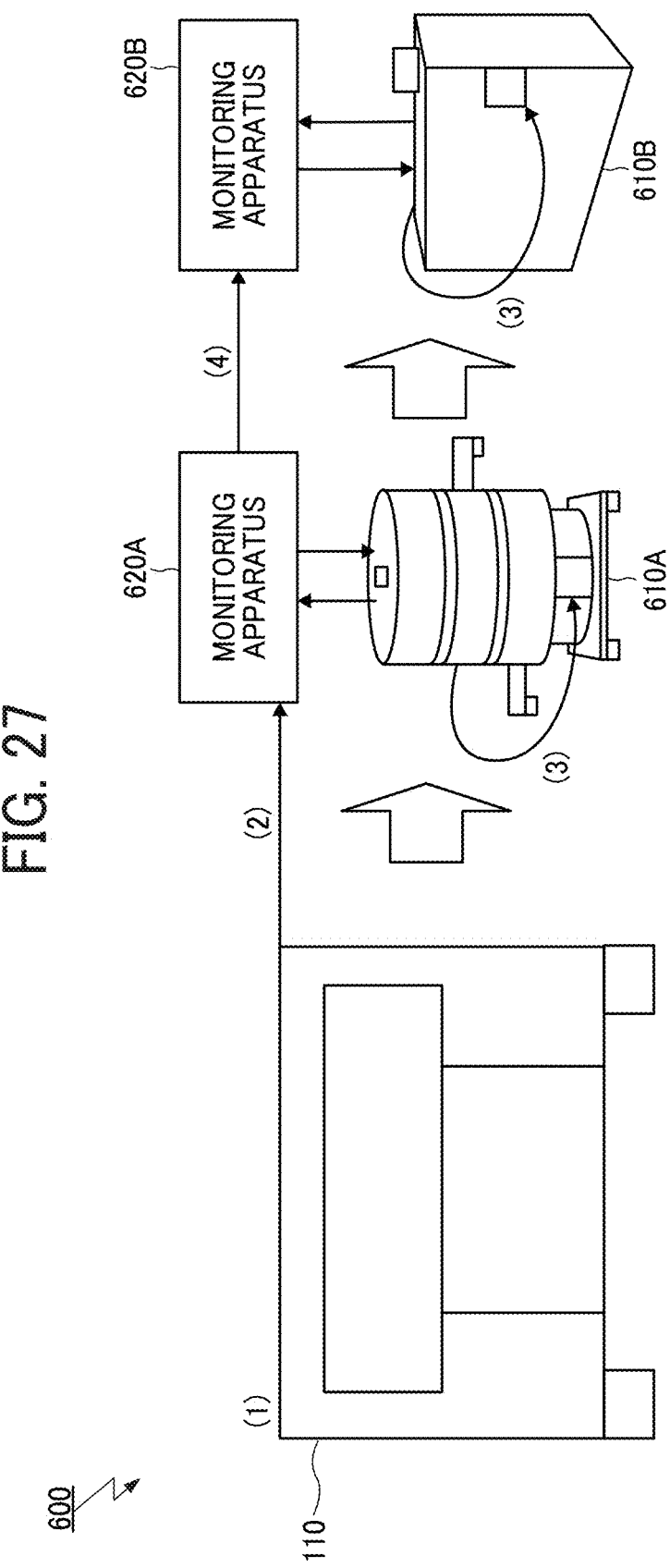
FIG. 27 is an illustration of an entire configuration of a three-dimensional fabrication system according to an embodiment of the present disclosure.

In the fifth embodiment of FIG. 27 without a management apparatus 450, a monitoring apparatus performs the processes performed by the management apparatus 450 in the above-described embodiments. As illustrated in FIG. 27, the three-dimensional fabrication system 600 includes a three-dimensional fabrication apparatus 110 that fabricates a three-dimensional object, one or more peripheral devices 610A and 610B, and one or more monitoring apparatuses 620A and 620B (a first monitoring apparatus and a second monitoring apparatus) corresponding to the one or more peripheral devices 610A and 610B.

The three-dimensional fabrication apparatus 110 receives data used to fabricate a desired three-dimensional object. The peripheral device 610 is connected to and at a subsequent stage of the three-dimensional fabrication apparatus 110, and serves to further process a resultant object produced by the three-dimensional fabrication apparatus 110. The three-dimensional fabrication apparatus 110 and the peripheral device 610 are connected through a transfer path. Through the transfer path, the resultant object of the three-dimensional fabrication apparatus 110 is transferred to each peripheral device 610.

In the embodiments described, the three-dimensional fabrication system 600 further includes monitoring apparatuses 620A and 620B corresponding to the peripheral apparatuses 610A and 610B, respectively. The three-dimensional fabrication apparatus 110 and the monitoring apparatus 620 are connected by a wired or wireless connection or by a network.

The three-dimensional fabrication apparatus 110 performs the following: (1) acquire input data, setting information, and state information, and (2) notify the monitoring apparatus 620A of the peripheral device 610A at the subsequent stage of the three-dimensional fabrication apparatus 110, of the acquired information. The monitoring apparatus 620A performs the following: (3) acquire an image displayed by a display unit of the corresponding peripheral device 610A; and (4) adds information included in the display image to quality data received from the three-dimensional fabrication apparatus 110, and transmits the quality data to a subsequent monitoring apparatus 620B. The subsequent monitoring apparatus 620B acquires an image displayed by a display unit of the corresponding peripheral device 610B, and further adds information included in the display image to the quality data including information that has been acquired from the peripheral devices 610 corresponding to one or more monitoring apparatuses 620 so far, to manage the quality information.

Through repetition of such an operation, the final monitoring apparatus 620 (e.g., the monitoring apparatus 620B in FIG. 27, or a third monitoring apparatus) collects information (first information and second information) from the monitoring apparatuses 620A and 620B corresponding to the peripheral devices 610A and 610B connected to the three-dimensional fabrication apparatus 110. The final monitoring apparatus 620 stores and manages the acquired information (the first information to the second information, or the final information) in association with the quality data acquired from the three-dimensional fabrication apparatus 110.

In FIG. 20, the configuration particular to the three-dimensional fabrication system 600 according to the fifth embodiment is indicated by broken line. The monitoring apparatus 620 according to the fifth embodiment in FIG. 20 includes a monitoring management unit 626, a monitoring storage unit 628, and a monitoring comparator 630, in addition to a monitoring unit 622 and an acquisition unit 624. In the three-dimensional fabrication system 600 without the management apparatus 450 according to the fifth embodiment, the monitoring apparatus 620 acquires, as an image, setting information and state information displayed by the display unit 616 of the peripheral device 610, and extracts the setting information and state information from the image, transmitting the acquired image data, and setting information and state information to a monitoring unit 622 of a subsequent monitoring apparatus 620.

In the configuration without the management apparatus 450, the monitoring management unit 626 operates in a similar manner to the management unit 452 of the management apparatus 450. The monitoring management unit 626 manages the image acquired by the acquisition unit 624, in association with quality data. Further, the monitoring management unit 626 of the monitoring apparatus 620 connected to the final peripheral device 610 manages, in addition to the image acquired by the acquisition unit 624, the setting information and state information received from the other peripheral devices 610 in association with quality data. The monitoring management unit 626 further manages quality data by flagging the quality data as being possible quality defect based on the comparison results of the monitoring comparator 630.

In the configuration without the management apparatus 450, the monitoring storage unit 628 operates in a similar manner to the storage unit 456 of the management apparatus 450. In the configuration without the management apparatus 450, the monitoring storage unit 628 is a nonvolatile memory that stores permissible-range information (i.e., numerical-range information) for each item of the setting information and state information.

In the configuration without the management apparatus 450, the monitoring comparator 630 compares the values of the setting information and state information acquired by the acquisition unit 624 with their corresponding permissible ranges stored in the monitoring storage unit 630, and notifies the monitoring management unit 626 of the comparison result in a similar manner to the comparator 458.

The configuration according to the fifth embodiment enables information on a display image of the peripheral device to be stored and managed in association with quality data.

The configurations according to the fourth embodiment and the fifth embodiment can collectively manage the information acquired from multiple peripheral devices in association with quality data, and thus increases the efficiency of analysis. A collectively data managing method involves the use of the management apparatus 450 as in the configuration according to the fourth embodiment. Alternatively, the data managing method involves transmitting data between multiple monitoring apparatuses 620, which are edge devices installed on or connected to the corresponding peripheral devices 610, and causing the final monitoring apparatus 620 to aggregate and collectively store data as in the fifth embodiment. In any of these methods, acquiring at least one of the setting information and the state information on a display unit of a peripheral device and adding the acquired at least one of the setting information and the state information to the quality data facilitate analysis of the causes of quality defects. Such a method particularly enables acquisition of information needed for the analysis, even from any device that fails to provide such information in logs and any device unconnected to the three-dimensional fabrication apparatus 110 via a network.

The above-described embodiments provide a data output apparatus, a three-dimensional fabrication system, and a data outputting method, which are capable of outputting quality information of a three-dimensional object.

The embodiments of the present disclosure enable collecting, storing, and outputting of quality data such as sensor data, which is used to analyze the cause of a quality defect detected from an object being fabricated by the three-dimensional fabrication apparatus. Such quality data can be output for quality assurance. Each piece of sensor data is preferably recorded with its acquiring timing in association with local data (e.g., each control code and an instruction or an instruction group included in each control code) of input data for fabrication. This enables the three-dimensional fabrication apparatus 110 to assess quality of a fabricated object and output the assessment result, and further analyze in detail a cause of quality defect when the quality defect is detected.

Each function in the exemplary embodiment may be implemented by a program described in C, C++, C# or Java (registered trademark). The program may be provided using any storage medium that is readable by an apparatus, such as a hard disk drive, compact disc (CD) ROM, magneto-optical disc (MO), digital versatile disc (DVD), a flexible disc, erasable programmable read-only memory (EPROM), or electrically erasable PROM. Alternatively, the program may be transmitted via network such that other apparatus can receive it.

A data output apparatus (212, 216) includes: first circuitry (216, 217) configured to acquire predetermined information used for a three-dimensional fabrication; and second circuitry (212, 215) configured to output quality information for a three-dimensional object fabricated during the three-dimensional fabrication based on the predetermined information.

In the data output apparatus (212, 216), the second circuitry (212, 213) is further configured to analyze the predetermined information to determine whether quality of the three-dimensional object is acceptable. The quality information includes a result of the determination by the second circuitry.

In the data output apparatus (212, 216), the determination whether quality of the three-dimensional object is acceptable includes an assessment of quality of one of: an entirety of the three-dimensional object; one or more portions of the three-dimensional object; and a combination of the entirety of the three-dimensional object and one or more portions of the three-dimensional object.

In the data output apparatus (212, 216), the first circuitry is further configured to perform an error determination based on the predetermined information. The analysis by the second circuitry involves a use of information obtained for a longer period of time and more complicated analytical processing than the error determination by the first circuitry.

In the data output apparatus (212, 216), the second circuitry (212, 214) is further configured to record measurement data, obtained by sensors (222x to 224e) during the three-dimensional fabrication based on input data, in association with part of the input data. The predetermined information includes the measurement data.

In the data output apparatus (212, 216), the predetermined information includes at least one selected from the group consisting of error information based on the measurement data, setting information for the three-dimensional fabrication, status information during the three-dimensional fabrication, image information of an object being fabricated during the three-dimensional fabrication, and 3D measurement data of the three-dimensional object being fabricated during the three-dimensional fabrication.

In the data output apparatus (212, 216), the measurement data includes a measurement value of at least one selected from the group consisting of current of one or more motors of a three-dimensional fabrication apparatus, a speed of the one or more motors, and temperature of one or more areas in the three-dimensional fabrication apparatus.

In the data output apparatus (212, 216), the association of the measurement data with the input data is based on time, a time period elapsed from a predetermined time point during the three-dimensional fabrication, or information representing a relation of the measurement data and the input data.

In the data output apparatus (212, 216), the second circuitry (212, 215) is configured to output the quality information with the predetermined information.

In the data output apparatus (212, 216), the second circuitry (212, 215) is configured to output the predetermined information to an external device.

A three-dimensional fabrication system (400) includes a three-dimensional fabrication apparatus (110) configured to perform a three-dimensional fabrication in accordance with input data. The three-dimensional fabrication apparatus (110) includes first circuitry (216, 217) configured to acquire predetermined information used for the three-dimensional fabrication; and second circuitry (212, 215) configured to output quality information for a three-dimensional object fabricated during the three-dimensional fabrication based on the predetermined information.

The three-dimensional fabrication system (400) further includes a monitor (422 or 622) configured to monitor an image displayed on a display unit of a peripheral device (410).

The three-dimensional fabrication system (400) further includes circuitry (420 or 460 or 450) is further configured to acquire information from the image acquired by the monitor (422) and manage the acquired information.

In the three-dimensional fabrication system (400), the circuitry (450 or 620) is further configured to acquire and manage information from one or more peripheral devices and record the acquired information together with the input data.

In the three-dimensional fabrication system (400), the circuitry is further configured to: extract at least one of setting information and state information from the image acquired from the one or more peripheral devices; and store the input data together with at least one of: the image; and the at least one of the setting information and the state information, which have been extracted from the image.

In the three-dimensional fabrication system (400), the circuitry is configured to: determine whether at least one of the setting information and the state information is changed; based on a determination that the at least one of the setting information and the state information is changed, manage the at least one of the setting information and the state information, which have been determined to be changed, together with the stored setting information and state information.

In the three-dimensional fabrication system (400), the circuitry is configured to manage a possible number of pieces of at least one of the setting information and the state information to be additionally stored.

In the three-dimensional fabrication system (400), the circuitry is configured to: store a permissible range for each item of at least one of the setting information and the state information; compare a value of each item of at least one of the setting information and the state information with a corresponding permissible range of the permissible ranges; and based on a result of the comparing, flag each input data for at least one of setting information and state information whose item has a value out of a corresponding permissible range of the permissible ranges, as being a possible quality defect.

In the three-dimensional fabrication system (400), in response to additional storing of a permissible range for an item of at least one of setting information and state information concerned, the circuitry is further configured to compare a value for the item of the at least one of setting information and state information concerned, with the permissible range.

The three-dimensional fabrication system (400) further includes: a management apparatus including circuitry configured to receive the quality information output from the three-dimensional fabrication apparatus; and one or more monitoring apparatuses each including another circuitry configured to monitor the one or more peripheral devices. The third circuitry is further configured to acquire information from the one or more peripheral devices and manage the acquired information together with the input data.

The three-dimensional fabrication system (400) further includes one or more monitoring apparatuses including circuitries configured to monitor the one or more peripheral devices, respectively. In a first monitoring apparatus of the one or more monitoring apparatuses, a corresponding one circuitry of the one or more circuitries is configured to: receive the quality information output from the three-dimensional fabrication apparatus; acquire first information displayed on a display unit of a corresponding one peripheral device of the one or more peripheral devices; add the acquired first information to the quality information; and output the quality information including the first information to a second monitoring apparatus subsequent to the first monitoring apparatus. In the second monitoring apparatus, a corresponding one circuitry of the one or more circuitries is configured to: receive the quality information including the first information output from the first monitoring apparatus; acquire second information displayed on a display unit of a corresponding one peripheral device of the one or more peripheral devices; add the acquired second information to the received quality information including the first information; and output the quality information including the first information and the second information to a third monitoring apparatus subsequent to the second monitoring apparatus. In a final monitoring apparatus of the one or more monitoring apparatus, a corresponding one circuitry of the one or more circuitries is configured to acquire final information from a corresponding one peripheral device of the one or more peripheral devices and manage the first information to the acquired final information with the quality information.

A device includes circuitry configured to: receive the quality information output from the data output apparatus; monitor a peripheral device; acquire, from the peripheral device, information that is an image displayed on a display unit of the peripheral device; acquire information from the acquired image; and manage the acquired information with the quality information.

A data output method executed by computer includes acquiring predetermined information used for fabrication of a three-dimensional object; and outputting quality information for the three-dimensional object fabricated based on the predetermined information.

Although several embodiments of the present disclosure have been described above, embodiments of the present disclosure are not limited to the above-described embodiments, and various modifications may be made without departing from the spirit and scope of the present disclosure. Such modifications are included within the scope of the present disclosure. The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A data output apparatus comprising:
   first circuitry configured to
      record codes used for a three-dimensional fabrication of a three-dimensional object,
      acquire sensor data, the sensor data corresponding to a respective one of the codes, the sensor data being based on a property of a three-dimensional fabrication device configured to execute a respective one of the codes, the property being at least one of a temperature, an electric current, and a speed, and
      record the sensor data relating each code with the sensor data of the respective code based on time information to form quality data; and
   second circuitry configured to
      generate quality information for the three-dimensional object fabricated during the three-dimensional fabrication based on assessing the quality data, the quality information including a determination on a presence of a quality defect,
      determine a cause of the quality defect, based on the quality defect being present, the quality information further including the cause, and
      output the quality information,
   the first circuitry being further configured to determine to end fabrication of the three-dimensional object based on the quality information of the three-dimensional object.

2. The data output apparatus according to claim 1, wherein the second circuitry is further configured to use a machine learning model in analyzing the quality data.

3. The data output apparatus according to claim 1, wherein the determination on the presence the a quality defect includes an assessment of quality of one of:
   an entirety of the three-dimensional object;
   one or more portions of the three-dimensional object; and
   a combination of the entirety of the three-dimensional object and one or more portions of the three-dimensional object.

4. The data output apparatus according to claim 1, wherein
   the first circuitry is further configured to
      perform an error determination based on the quality data in a first cycle, and
      determine to end fabrication of the three-dimensional object based on the error determination, and
   the generating the quality information by the second circuitry involves a use of the quality information obtained for a second cycle, the second cycle being longer than the first cycle, and performing a further analysis than the error determination by the first circuitry.

5. The data output apparatus according to claim 1, wherein the sensor data includes at least one selected from the group consisting of error information based on the sensor data, setting information for the three-dimensional fabrication, status information during the three-dimensional fabrication, image information of an object being fabricated during the three-dimensional fabrication, and 3D measurement data of the three-dimensional object being fabricated during the three-dimensional fabrication.

6. The data output apparatus according to claim 1, wherein the sensor data includes a measurement value of at least one selected from the group consisting of current of one or more motors of a three-dimensional fabrication apparatus, a speed of the one or more motors, and temperature of one or more areas in the three-dimensional fabrication apparatus.

7. The data output apparatus according to claim 1, wherein the second circuitry is configured to output the quality information with the quality data.

8. The data output apparatus according to claim 1, further comprising a communication device configured to transmit the quality information to an external device.

9. The data output apparatus according to claim 1, wherein
   the first circuitry is further configured to acquire log data indicating state information used for three-dimensional fabrication and a time of the log data, and
   the quality data further includes the log data and the time of the log data.

10. The data output apparatus according to claim 1, wherein the quality defect is internal to the three-dimensional object.

11. A three-dimensional fabrication system comprising:
    a three-dimensional fabrication apparatus configured to perform a three-dimensional fabrication of a three-dimensional object in accordance with input data,
    the three-dimensional fabrication apparatus including:
       first circuitry configured to
          record codes used for the three-dimensional fabrication,
          acquire sensor data, the sensor data corresponding to a respective one of the codes, the sensor data being based on a property of a three-dimensional fabrication device configured to execute a respective one of the codes, the property being at least one of a temperature, an electric current, and a speed, and
          record the sensor data relating each code with the sensor data of the respective code based on time information to form quality data; and
       second circuitry configured to
          generate quality information for the three-dimensional object fabricated during the three-dimensional fabrication based on assessing the quality data, the quality information including a determination on a presence of a quality defect,
          determine a cause of the quality defect, based on the quality defect being present, the quality information further including the cause, and
          output the quality information,
       the first circuitry being further configured to determine to end fabrication of the three-dimensional object based on the quality of the three-dimensional object.

12. The three-dimensional fabrication system according to claim 11, further comprising a monitoring apparatus configured to acquire an image of a peripheral device, transform the image into a processed image including peripheral information displayed on the peripheral device, and monitor the peripheral information, the peripheral information including a setting item and a set value.

13. The three-dimensional fabrication system according to claim 12, wherein the three-dimensional fabrication apparatus further includes
management circuitry configured to acquire the peripheral information from the transformed image and manage the acquired peripheral information.

14. The three-dimensional fabrication system according to claim 13,
wherein the management circuitry is further configured to acquire and manage peripheral information from one or more peripheral devices and record the acquired peripheral information from the one or more peripheral devices together with the input data.

15. The three-dimensional fabrication system according to claim 14, wherein the management circuitry is further configured to:
extract at least one of setting information and state information from the image acquired from the one or more peripheral devices; and
store the input data together with at least one of:
the image; and
the at least one of the setting information and the state information, which have been extracted from the image.

16. The three-dimensional fabrication system according to claim 15,
wherein the management circuitry is configured to:
determine whether at least one of the setting information and the state information is changed;
based on a determination that the at least one of the setting information and the state information is changed, manage the at least one of the setting information and the state information, which have been determined to be changed, together with the stored setting information and state information.

17. The three-dimensional fabrication system according to claim 15,
wherein the management circuitry is configured to manage a number of pieces of at least one of the setting information and the state information from each of the one or more peripheral devices to be additionally stored.

18. The three-dimensional fabrication system according to claim 15,
wherein the management circuitry is configured to:
store a permissible range for each item of at least one of the setting information and the state information;
compare a value of each item of at least one of the setting information and the state information with a corresponding permissible range of the permissible ranges; and
based on a result of the comparing, flag each input data for at least one of setting information and state information whose item has the value out of the corresponding permissible range of the permissible ranges, as being a possible quality defect.

19. The three-dimensional fabrication system according to claim 18,
wherein in response to additional storing of a permissible range for an item of at least one of setting information and state information concerned, the management circuitry is further configured to compare the value for the item of the at least one of setting information and state information concerned, with the permissible range.

20. The three-dimensional fabrication system according to claim 11, further comprising:
a management apparatus configured to receive the quality information output from the three-dimensional fabrication apparatus; and
one or more monitoring apparatuses each including monitoring circuitry configured to monitor one or more peripheral devices,
wherein the monitoring circuitry is further configured to acquire information from the one or more peripheral devices and manage the acquired information together with the input data.

* * * * *